(12) United States Patent
Hara et al.

(10) Patent No.: US 11,014,600 B2
(45) Date of Patent: May 25, 2021

(54) LEANING VEHICLE

(71) Applicant: YAMAHA HATSUDOKI KABUSHIKI KAISHA, Iwata (JP)

(72) Inventors: Nobuo Hara, Iwata (JP); Yukihide Fukuhara, Iwata (JP); Takeshi Toyota, Iwata (JP); Tatsuya Nagata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 203 days.

(21) Appl. No.: 15/984,100

(22) Filed: May 18, 2018

(65) Prior Publication Data
US 2018/0265117 A1 Sep. 20, 2018

Related U.S. Application Data

(63) Continuation-in-part of application No. PCT/JP2016/084349, filed on Nov. 18, 2016.

(30) Foreign Application Priority Data

Nov. 20, 2015 (JP) .............................. JP2015-228014

(51) Int. Cl.
  *B62K 5/08* (2006.01)
  *B62D 5/04* (2006.01)
  (Continued)

(52) U.S. Cl.
  CPC ......... *B62D 5/046* (2013.01); *B60G 17/0163* (2013.01); *B62D 6/00* (2013.01);
  (Continued)

(58) Field of Classification Search
  CPC . B62D 5/046; B62D 6/00; B62D 9/02; B60G 17/0163; B60G 2202/42;
  (Continued)

(56) References Cited

U.S. PATENT DOCUMENTS 5,639,119 A   6/1997 Plate et al.
5,813,697 A   9/1998 Bargenquast et al.
(Continued)

FOREIGN PATENT DOCUMENTS

CA   2943765 A1   10/2015
EP   0796193 A1   9/1997
(Continued)

OTHER PUBLICATIONS

Robin Hibbard and Dean Karnopp, "Methods of Cotrolling the Lean Angle of Tilting Vehicles", Advanced Automotive Technologies 1993, the U.S, ASME, 1993, vol. 52, pp. 311-320, ISBN:0/7918-1046-1.
(Continued)

*Primary Examiner* — James M McPherson
*Assistant Examiner* — Tiffany P Ohman
(74) *Attorney, Agent, or Firm* — Rabin & Berdo, P.C.

(57) ABSTRACT

A leaning vehicle includes a body frame, a steered wheel and a non-steered wheel, a motor, a left-right-tilt-angle-detection-section, and a control device that controls the motor to apply a steering force to the steered wheel. The steering force steers the steered wheel to turn the leaning vehicle rightward in a case where the body frame tilts rightward, and steers the steered wheel to turn the leaning vehicle leftward in a case where the body frame tilts leftward. Alternatively, the steering force steers the steered wheel to turn the leaning vehicle leftward in the case where the body frame tilts rightward, and steers the steered wheel to turn the leaning vehicle rightward in the case where the body frame tilts leftward.

20 Claims, 12 Drawing Sheets

(51) Int. Cl.
| | |
|---|---|
| *B62K 5/10* | (2013.01) |
| *B60G 17/016* | (2006.01) |
| *B62D 6/00* | (2006.01) |
| *G05D 1/08* | (2006.01) |
| *G05D 3/12* | (2006.01) |
| *B62K 5/05* | (2013.01) |
| *B62K 21/00* | (2006.01) |
| *B62D 9/02* | (2006.01) |
| *B62J 45/415* | (2020.01) |

(52) U.S. Cl.
CPC ............... *B62K 5/08* (2013.01); *B62K 5/10* (2013.01); *G05D 1/0891* (2013.01); *G05D 3/125* (2013.01); *B60G 2202/42* (2013.01); *B60G 2300/45* (2013.01); *B60G 2400/208* (2013.01); *B60G 2400/41* (2013.01); *B60G 2400/42* (2013.01); *B62D 9/02* (2013.01); *B62J 45/4151* (2020.02); *B62K 5/05* (2013.01); *B62K 21/00* (2013.01)

(58) Field of Classification Search
CPC ............ B60G 2300/45; B60G 2400/208; B62K 5/08; B62K 5/10; B62K 5/05; B62K 21/00; B62K 2207/02; G05D 1/0891; G05D 3/125
USPC .......................................................... 701/41
See application file for complete search history.

(56) References Cited

U.S. PATENT DOCUMENTS

| | | | |
|---|---|---|---|
| 5,927,424 | A | 7/1999 | Van Den Brink et al. |
| 7,264,251 | B2 | 9/2007 | Marcacci |
| 7,802,800 | B2 | 9/2010 | Melcher |
| 8,141,890 | B2 | 3/2012 | Hughes et al. |
| 8,762,003 | B2 | 6/2014 | Mercier |
| 8,899,600 | B2 | 12/2014 | Gaillard-Groleas et al. |
| 9,744,952 | B2 | 8/2017 | Seto et al. |
| 9,994,277 | B2 | 6/2018 | Malphettes |
| 2005/0167174 | A1 | 8/2005 | Marcacci |
| 2005/0167217 | A1 | 8/2005 | Marcacci |
| 2007/0246903 | A1 | 10/2007 | Melcher |
| 2009/0152940 | A1 | 6/2009 | Mercier et al. |
| 2010/0044977 | A1 | 2/2010 | Hughes et al. |
| 2010/0324808 | A1 | 12/2010 | Moulene et al. |
| 2011/0006498 | A1 | 1/2011 | Mercier |
| 2011/0148052 | A1 | 6/2011 | Quemere et al. |
| 2011/0239787 | A1 | 10/2011 | Kato et al. |
| 2012/0119453 | A1 | 5/2012 | Mercier |
| 2012/0267870 | A1 | 10/2012 | Mercier |
| 2013/0068550 | A1 | 3/2013 | Gale |
| 2013/0113174 | A1 | 5/2013 | Mercier |
| 2013/0161919 | A1 | 6/2013 | Gaillard-Groleas et al. |
| 2013/0193656 | A1* | 8/2013 | Itoh .................. B62K 5/05 280/5.509 |
| 2013/0211674 | A1 | 8/2013 | Young |
| 2014/0124286 | A1 | 5/2014 | Hayashi |
| 2014/0188341 | A1 | 7/2014 | Takenaka et al. |
| 2014/0361502 | A1 | 12/2014 | Kitamura et al. |
| 2015/0158360 | A1 | 6/2015 | Uebayashi et al. |
| 2015/0165855 | A1 | 6/2015 | Yu et al. |
| 2017/0106930 | A1 | 4/2017 | Hara et al. |
| 2018/0086168 | A1 | 3/2018 | Iguchi et al. |
| 2018/0086169 | A1 | 3/2018 | Iguchi et al. |
| 2018/0264906 | A1 | 9/2018 | Hara et al. |
| 2018/0265158 | A1 | 9/2018 | Hara et al. |
| 2019/0144035 | A1 | 5/2019 | Doerksen et al. |

FOREIGN PATENT DOCUMENTS

| | | |
|---|---|---|
| EP | 1516806 A1 | 3/2005 |
| EP | 1571016 A1 | 9/2005 |
| EP | 2127920 A1 | 12/2009 |
| EP | 2345576 A1 | 7/2011 |
| EP | 2451699 A1 | 5/2012 |
| EP | 2530005 A1 | 12/2012 |
| EP | 2585320 A1 | 5/2013 |
| EP | 2765024 A1 | 8/2014 |
| EP | 2767464 A1 | 8/2014 |
| EP | 2889210 A1 | 7/2015 |
| JP | 2005088742 A | 4/2005 |
| JP | 2010-047151 A | 3/2010 |
| JP | 2011-046294 A | 3/2011 |
| JP | 2011-073624 A | 4/2011 |
| JP | 2011-201504 A | 10/2011 |
| JP | 2012-076490 A | 4/2012 |
| JP | 2012-081784 A | 4/2012 |
| JP | 2013-112238 A | 6/2013 |
| JP | 2013-144471 A | 7/2013 |
| JP | 2014-091506 A | 5/2014 |
| JP | 2014-237362 A | 12/2014 |
| JP | 2015-112923 A | 6/2015 |
| WO | 02044008 A3 | 6/2002 |
| WO | 02068228 A1 | 9/2002 |
| WO | 2009059099 A2 | 5/2009 |
| WO | WO-2011/005945 A1 | 1/2011 |
| WO | 2011029795 A1 | 3/2011 |
| WO | WO 2011-059456 A1 | 5/2011 |
| WO | WO 2011-161334 A1 | 12/2011 |
| WO | WO-2013/051195 A1 | 4/2013 |
| WO | WO-2015/146680 A1 | 10/2015 |
| WO | 2017115293 A1 | 7/2017 |

OTHER PUBLICATIONS

Noriaki Hirose et al. "Proposal of motion model around roll axis and posture stabilization control for personal mobility with leaning mechanism", Transactions of the JSME (in Japanese). The Japan Society of Mechanical Engineers, 2015, vol. 81, No. 826, pp. I-12, Doi:I0.1299/transjsme.I5-00087, ISSN: 2187-9761.

* cited by examiner

LEANING VEHICLE

CROSS-REFERENCES TO RELATED APPLICATIONS

The present application is a continuation-in-part application of International Application No. PCT/JP2016/084349, filed on Nov. 18, 2016, and having the benefit of the earlier filing date of Japanese Application No. 2015-228014, filed Nov. 20, 2015. The content of each of the identified applications is incorporated herein by reference in its entirety.

TECHNICAL FIELD

The present teaching relates to a leaning vehicle including a tiltable body frame.

BACKGROUND ART

Patent Document 1, for example, proposes a known leaning vehicle including a tiltable body frame. When the leaning vehicle turns leftward, the body frame tilts leftward, whereas when the leaning vehicle turns rightward, the body frame tilts rightward.

The leaning vehicle of Patent Document 1 includes a motor that applies a steering torque to a steered wheel. This motor is a power assisting means. The power assisting means reduces a burden of a rider in steering. Accordingly, steering by the rider may be assisted during low-speed traveling.

CITATION LIST

Patent Document

Patent Document 1: Japanese Patent Application Publication No. 2011-73624

SUMMARY OF INVENTION

Technical Problem

Inventors of the present teaching studied acquisition of a new function by using a motor that applies a steering torque.

An object of the present teaching is to provide a leaning vehicle having a new function using a motor that applies a force of steering a steered wheel.

Solution to Problem

The inventors of the present teaching studied to provide a new function by using a motor that applies a force of steering a steered wheel. The power assisting means described in Patent Document 1 controls a motor based on a steering torque input by a rider. As control different from the control of Patent Document 1, the inventors studied control of a motor based on not a steering torque input by a rider but other information.

Specifically, the inventors studied application of a force of steering a steered wheel by controlling a motor in accordance with a tilt angle in the left direction of a body frame or in the right direction of the body frame. The study found that a behavior causing a rise of the body frame is observed by applying a steering force to the steered wheel in the direction that causes the vehicle to turn rightward, that is, a rightward steering force, when the body frame leans rightward. It was also found that a behavior causing a rise of the body frame is observed by applying a steering force to the steered wheel in the direction that causes the vehicle to turn leftward, that is, a leftward steering force, when the body frame leans leftward.

The study also found that a behavior causing the body frame to further tilt rightward is observed by applying a leftward steering force to the steered wheel when the body frame tilts rightward. It was also found that a behavior causing the body frame to further tilt leftward is observed by applying a rightward steering force to the steered wheel when the body frame tilts leftward.

The inventors also tried to adjust a force of steering the steered wheel applied by the motor when the body frame tilts in the left direction or in the right direction. First, the inventors tried to adjust the magnitude of the steering force applied to the steered wheel by the motor. Consequently, the following phenomena were observed.

It was found that, in some cases, a rider feels as if characteristics of the leaning vehicle changed in accordance with a change in the magnitude of the steering force applied to the steered wheel by the motor during tilting. For example, it was found that, in some cases, the rider feels a change in easiness in operation of tilting the body frame in the left direction or in the right direction.

It was also found that, in some cases, the rider feels as if characteristics of the leaning vehicle changed in accordance with a change in a steering retaining force during turning of the leaning vehicle. Here, during turning of the leaning vehicle, in some cases, self-steering generates a force of steering the steered wheel in the turning direction. The steering retaining force refers to a force in a direction against a steering force by the self-steering and a force input by the rider.

It was also found that some riders may follow a target turning line even with a small tilt angle of the body frame with respect to the left direction or to the right direction by adjusting the magnitude of the steering force applied to the steered wheel by the motor during turning of the leaning vehicle.

Next, a study was conducted by adjusting the range of the tilt angle in applying a steering force to the steered wheel by the motor. As a result, it was found that, in some cases, in the course of a change of the tilt angle of the body frame with respect to the left direction or to the right direction, when the motor starts applying a steering force to the steered wheel at some tilt angle, a rider may feel a change in a behavior of the leaning vehicle based on the start of the application. For example, based on this phenomenon, the rider may know the degree of the tilt angle of the body frame.

From the foregoing phenomena, the inventors found that the following new functions may be achieved. For example, easiness in a rider's operation of causing the body frame to tilt in the left direction or in the right direction may be changed by adjusting the steering force applied to the steered wheel by the motor in accordance with the tilt angle of the body frame with respect to the left direction or to the right direction. In addition, the steering retaining force during turning may be adjusted, for example. Moreover, for example, a rider may know the degree of a tilt of the body frame in the left direction or in the right direction during turning. In the manner described above, by adjusting the steering force applied to the steered wheel by the motor in accordance with the tilt angle, functions concerning steering or the left-right tilt angle except for a power assisting function of assisting steering by the rider may be provided. These new functions may be used together with the power assisting function.

Based on the foregoing findings, the inventors arrived at a leaning vehicle having the following configuration.

A leaning vehicle according to an embodiment of the present teaching includes: a body frame; a steering shaft rotatably connected to the body frame; a first wheel connected to the steering shaft to be rotated together with the steering shaft relative to the body frame; a second wheel located in a front-rear direction of the body frame relative to the first wheel, the second wheel configured to be incapable of being rotated together with the steering shaft; a linkage mechanism that tilts the body frame leftward based on a first rotation of the steering shaft turning the leaning vehicle leftward in a left-right direction of the leaning vehicle, and that tilts the body frame rightward based on a second rotation of the steering shaft turning the leaning vehicle rightward in the left-right direction of the leaning vehicle; a motor that applies a steering force to steer the first wheel based on a rotation of the steering shaft; a left-right-tilt-angle-detection-section (left-right-tilt-angle-detection-system) that respectively detects a left-right tilt angle of the body frame in the left direction of the leaning vehicle and in the right direction of the leaning vehicle; and a control device that controls the motor. The control device causes the motor to output a steering force to steer the first wheel in a direction that causes the leaning vehicle to turn rightward in a case where the body frame tilts rightward in accordance with a left-right tilt angle detected by the left-right-tilt-angle-detection-section, and causes the motor to output a steering force to steer the first wheel in a direction that causes the leaning vehicle to turn leftward in a case where the body frame tilts leftward in accordance with the left-right tilt angle detected by the left-right-tilt-angle-detection-section, or the control device causes the motor to output a steering force to steer the first wheel in the direction that causes the leaning vehicle to turn leftward in the case where the body frame tilts rightward in accordance with the left-right tilt angle detected by the left-right-tilt-angle-detection-section, and causes the motor to output a steering force to steer the first wheel in the direction that causes the leaning vehicle to turn rightward in the case where the body frame tilts leftward in accordance with the left-right tilt angle detected by the left-right-tilt-angle-detection-section (Configuration 1).

With the configuration 1, while the leaning vehicle is travelling with the body frame tilted in the left direction or in the right direction, a steering force in accordance with the tilt angle in the left direction of the body frame or in the right direction of the body frame is output from the motor to the first wheel. Accordingly, for example, a vehicle characteristic or a behavior of the leaning vehicle may be adjusted during traveling with a tilt. Thus, a function regarding steering or the left-right tilt angle, for example, different from a power assisting function of assisting steering by a rider may be provided. That is, the leaning vehicle may provide a new function using a motor that applies a steering force to steer the first wheel.

In the leaning vehicle having the configuration 1 described above, the control device may change a magnitude of a steering force to steer the first wheel in the direction that causes the leaning vehicle to turn rightward output from the motor in the case where the body frame tilts rightward in accordance with the left-right tilt angle detected by the left-right-tilt-angle-detection-section, and change a magnitude of a steering force to steer the first wheel in the direction that causes the leaning vehicle to turn leftward output from the motor in the case where the body frame tilts leftward in accordance with the left-right tilt angle detected by the left-right-tilt-angle-detection-section, or the control device may change a magnitude of a steering force to steer the first wheel in the direction that causes the leaning vehicle to turn leftward output from the motor in the case where the body frame tilts rightward in accordance with the left-right tilt angle detected by the left-right-tilt-angle-detection-section, and change a magnitude of a steering force to steer the first wheel in the direction that causes the leaning vehicle to turn rightward output from the motor in the case where the body frame tilts leftward in accordance with the left-right tilt angle detected by the left-right-tilt-angle-detection-section (Configuration 2).

With the configuration 2, while the body frame tilts leftward or rightward, the magnitude of the steering force applied by the motor to the first wheel is changed in accordance with the tilt angle. Accordingly, for example, a vehicle characteristic or a behavior of the leaning vehicle during traveling with a tilt, may be changed in accordance with the tilt angle of the body frame. Thus, a function different from steering assistance for a rider may be provided by using a motor that applies a steering force to a first wheel. A configuration in which it is controlled whether to output a steering force from the motor to the first wheel in accordance with the tilt angle is also an example of the configuration 2.

In the leaning vehicle having the configuration 2 described above, the control device may limit a change rate over time, also referred to as time change rate, of the magnitude of the steering force to steer the first wheel in the direction that causes the leaning vehicle to turn rightward output from the motor in the case where the body frame tilts rightward, and limit a time change rate of the magnitude of the steering force to steer the first wheel in the direction that causes the leaning vehicle to turn leftward output from the motor in the case where the body frame tilts leftward, or the control device may limit a time change rate of the magnitude of the steering force to steer the first wheel in the direction that causes the leaning vehicle to turn leftward output from the motor in the case where the body frame tilts rightward, and limit a time change rate of the magnitude of the steering force to steer the first wheel in the direction that causes the leaning vehicle to turn rightward output from the motor in the case where the body frame tilts leftward (Configuration 3).

With the configuration 3 described above, the time change rate of the steering force applied from the motor to the first wheel during traveling of the leaning vehicle with a tile is limited. Accordingly, the speed of change in a vehicle characteristic or a behavior of the vehicle may be limited by a steering force applied from the motor.

In the leaning vehicle having the configuration 2 or 3 described above, the control device may change, in accordance with a vehicle speed, a change rate of the magnitude of the steering force to steer the first wheel in the direction that causes the leaning vehicle to turn rightward output from the motor in the case where the body frame tilts rightward with respect to the tilt angle, and change, in accordance with the vehicle speed, a change rate of the magnitude of the steering force to steer the first wheel in the direction that causes the leaning vehicle to turn leftward output from the motor in the case where the body frame tilts leftward with respect to the tilt angle or the control device may change, in accordance with the vehicle speed, a change rate of the magnitude of the steering force to steer the first wheel in the direction that causes the leaning vehicle to turn leftward output from the motor in the case where the body frame tilts rightward with respect to the tilt angle, and change, in accordance with the vehicle speed, a change rate of the magnitude of the steering force to steer the first wheel in the direction that causes the leaning vehicle to turn rightward output from the motor in the case where the body frame tilts leftward with respect to the tilt angle (Configuration 4).

With the configuration 4, the change rate of the magnitude of the steering force applied from the motor to the first wheel with respect to the tilt angle in the left direction of the body frame or in the right direction of the body frame may be changed in accordance with the vehicle speed. That is, a relationship between the tilt angle of the body frame and the steering force output by the motor may be changed in accordance with the vehicle speed. Thus, adjustment of a vehicle characteristic or a behavior, for example, by the steering force applied from the motor to the first wheel during traveling of the leaning vehicle with a tilt may be changed in accordance with the vehicle speed.

In the leaning vehicle having any one of the configurations 1 through 4, the control device may set a range of the left-right tilt angle in outputting the steering force to steer the first wheel in the direction that causes the leaning vehicle to turn rightward output from the motor in the case where the body frame tilts rightward, and set a range of the left-right tilt angle in outputting the steering force to steer the first wheel in the direction that causes the leaning vehicle to turn leftward output from the motor in the case where the body frame tilts leftward, or the control device may set a range of the left-right tilt angle in outputting the steering force to steer the first wheel in the direction that causes the leaning vehicle to turn leftward output from the motor in the case where the body frame tilts rightward, and set a range of the left-right tilt angle in outputting the steering force to steer the first wheel in the direction that causes the leaning vehicle to turn rightward output from the motor in the case where the body frame tilts leftward (Configuration 5).

With the configuration 5 described above, the tilt angle range in which the steering force is applied from the motor to the first wheel during traveling of the leaning vehicle with a tilt may be adjusted.

In the leaning vehicle having any one of the configurations 1 through 5, the control device may change, in accordance with a vehicle speed, a range of the left-right tilt angle in outputting the steering force to steer the first wheel in the direction that causes the leaning vehicle to turn rightward output from the motor in the case where the body frame tilts rightward, and change, in accordance with the vehicle speed, a range of the left-right tilt angle in outputting the steering force to steer the first wheel in the direction that causes the leaning vehicle to turn leftward output from the motor in the case where the body frame tilts leftward, or the control device may change, in accordance with the vehicle speed, a range of the left-right tilt angle in outputting the steering force to steer the first wheel in the direction that causes the leaning vehicle to turn leftward output from the motor in the case where the body frame tilts rightward, and change, in accordance with the vehicle speed, a range of the left-right tilt angle in outputting the steering force to steer the first wheel in the direction that causes the leaning vehicle to turn rightward output from the motor in the case where the body frame tilts leftward (Configuration 6).

With the configuration 6 described above, the tilt angle range in which the steering force is applied from the motor to the first wheel during traveling of the leaning vehicle with a tilt may be adjusted in accordance with the vehicle speed.

In the leaning vehicle having any one of the configurations 1 through 6, the control device may cause the motor to output the steering force to steer the first wheel in the direction that causes the leaning vehicle to turn rightward in the case where the body frame tilts rightward in accordance with the left-right tilt angle detected by the left-right-tilt-angle-detection-section and the vehicle speed, and cause the motor to output the steering force to steer the first wheel in the direction that causes the leaning vehicle to turn leftward in the case where the body frame tilts leftward in accordance with the left-right tilt angle detected by the left-right-tilt-angle-detection-section and the vehicle speed, or the control device may cause the motor to output the steering force to steer the first wheel in the direction that causes the leaning vehicle to turn leftward in the case where the body frame tilts rightward in accordance with the left-right tilt angle detected by the left-right-tilt-angle-detection-section and the vehicle speed, and cause the motor to output the steering force to steer the first wheel in the direction that causes the leaning vehicle to turn rightward in the case where the body frame tilts leftward in accordance with the left-right tilt angle detected by the left-right-tilt-angle-detection-section and the vehicle speed (Configuration 7).

With the configuration 7 described above, the steering force applied from the motor to the first wheel during traveling of the leaning vehicle with a tilt may be adjusted in accordance with the tilt angle of the body frame and the vehicle speed.

In the leaning vehicle having the configuration 7 described above, the control device may change, in accordance with the vehicle speed, a maximum value of a magnitude of the steering force to steer the first wheel in the direction that causes the leaning vehicle to turn rightward output from the motor in the case where the body frame tilts rightward, and change, in accordance with the vehicle speed, a maximum value of a magnitude of the steering force to steer the first wheel in the direction that causes the leaning vehicle to turn leftward output from the motor in the case where the body frame tilts leftward, or the control device may change, in accordance with the vehicle speed, a maximum value of a magnitude of the steering force to steer the first wheel in the direction that causes the leaning vehicle to turn leftward output from the motor in the case where the body frame tilts rightward, and change, in accordance with the vehicle speed, a maximum value of a magnitude of the steering force to steer the first wheel in the direction that causes the leaning vehicle to turn rightward output from the motor in the case where the body frame tilts leftward (Configuration 8).

With the configuration 8 described above, the maximum value of the magnitude of the steering force applied from the motor to the first wheel during traveling of the leaning vehicle with a tilt may be adjusted in accordance with the vehicle speed.

In the leaning vehicle having any one of the configurations 1 through 8, the control device may cause the motor to output the steering force to steer the first wheel in the direction that causes the leaning vehicle to turn rightward in the case where the body frame tilts rightward in accordance with the left-right tilt angle detected by the left-right-tilt-angle-detection-section and a time change rate of the left-right tilt angle, and cause the motor to output the steering force to steer the first wheel in the direction that causes the leaning vehicle to turn leftward in the case where the body frame tilts leftward in accordance with the left-right tilt angle detected by the left-right-tilt-angle-detection-section and the time change rate of the left-right tilt angle, or the control device may cause the motor to output the steering force to steer the first wheel in the direction that causes the leaning vehicle to turn leftward in the case where the body frame tilts rightward in accordance with the left-right tilt angle detected by the left-right-tilt-angle-detection-section and the time change rate of the left-right tilt angle, and cause the motor to output the steering force to steer the first wheel in the direction that causes the leaning vehicle to turn rightward in the case where the body frame tilts leftward in accordance with the left-right tilt angle detected by the left-right-tilt-angle-detection-section and the time change rate of the left-right tilt angle (Configuration 9).

With the configuration 9 described above, the steering force applied from the motor to the first wheel during traveling of the leaning vehicle with a tilt may be adjusted in accordance with the tilt angle in the left direction of the body frame or in the right direction of the body frame and the tilt angular velocity.

In the leaning vehicle having the configuration 1 described above, the motor includes: an electric power steering system including a first actuator that applies a steering force to the steering shaft; and a rotary force application device including a second actuator that applies a rotating force to the linkage mechanism (Configuration 10).

In the leaning vehicle having the configuration 1 described above, the leaning vehicle further includes a third wheel located in the left/right direction of the leaning vehicle with respect to the first wheel, wherein the linkage mechanism comprises: a left side member connected to the first wheel; a right side member connected to the third wheel; and a plate-shaped member connected to the left side member and the right side member and to the steering shaft, wherein the plate-shaped member is rotatably connected to the body frame such that rotation of the plate-shaped member relative to the body frame causes the body frame to tilt (Configuration 11).

In the following description, a "vertical angle" is an example of the "tilt angle of the body frame in the left direction of the leaning vehicle or in the right direction of the leaning vehicle" described above.

DESCRIPTION OF EMBODIMENT

Figure 1:
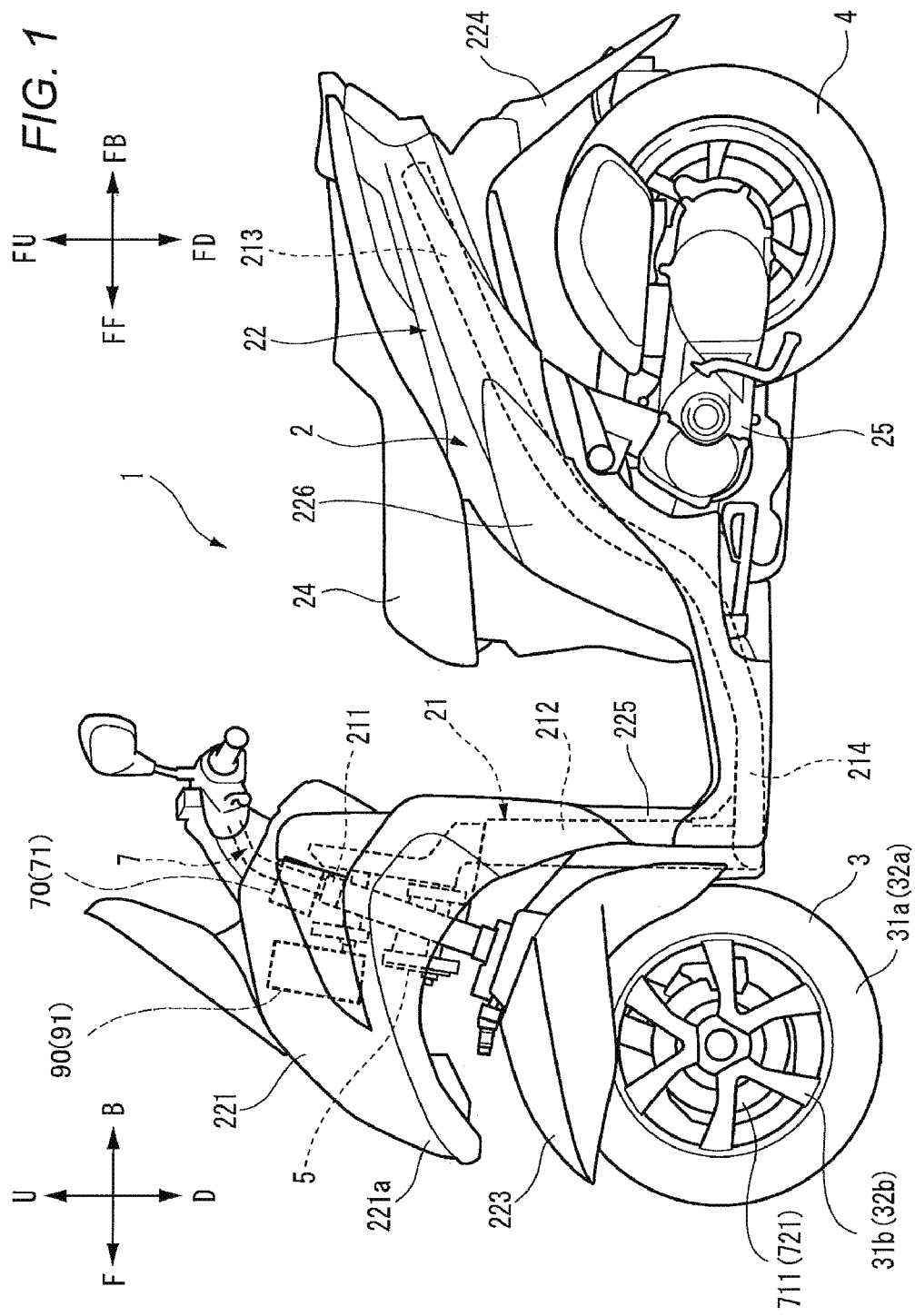
FIG. 1 An overall side view of a vehicle according to an embodiment of the present teaching.

In some cases, a leaning vehicle shows a phenomenon called self-steering in which when the leaning vehicle is tilted rightward, two front wheels are directed to rotate clockwise when viewed from above, and when the leaning vehicle is tilted leftward, the two front wheels are directed to rotate counterclockwise when viewed from above.

In such a vehicle, the position of a ground point between the right front wheel and the road surface, the position of a ground point between the left front wheel and the road surface, and the position of a barycenter of the vehicle may be changed by changing the direction of the front wheels.

By changing the positional relationship between the two ground points and the barycenter, the barycenter position may be shifted in the left direction or in the right direction relative to a front-rear axis of the vehicle (an imaginary line connecting the center point of the two front wheels in the left-right direction to the center point of the rear wheels in the left-right direction), and thereby, the vehicle may be tilted in the left direction or in the right direction. In the following description, the angle formed by the imaginary line extending in the top-bottom direction of the body frame with respect to the vertical direction will be referred to as a vertical angle. When the vertical angle is large, the vehicle tilts greatly in the left direction of the vehicle or in the right direction of the vehicle. When the vehicle stands upright, the vertical angle is zero degrees.

(1) A vehicle according to an embodiment of the present teaching includes a body frame, a right front wheel, a left front wheel, a linkage mechanism, a steering force transfer mechanism, a steering force application device (EPS), a pivot force application device, and a control section.

The right front wheel is disposed at the right of the body frame and is configured to enable a turn about a right steering axis extending in the top-bottom direction of the body frame.

The left front wheel is disposed at the left of the body frame and is configured to enable a turn about a left steering axis extending in the top-bottom direction of the body frame.

The linkage mechanism includes a cross member that is supported on the body frame to enable a pivot about a linkage axis extending in the front-rear direction and changes relative positions of the right front wheel and the left front wheel in the top-bottom direction of the body frame in accordance with a tilt of the body frame.

The steering force transfer mechanism transfers a first steering force input to a steering force input section by a rider to the right front wheel and the left front wheel.

The steering force application device (EPS) applies a second steering force to the steering force transfer mechanism by a first actuator.

The pivot force application device applies a pivot force to the body frame, to the cross member of the linkage mechanism by a second actuator.

The control section includes a control section that controls at least one of the steering force application device or the pivot force application device in such a manner that at least one of the second steering force or the pivot force is generated to suppress a behavior causing an increase of the vertical angle.

The control section determines an EPS instruction value for determining a magnitude of an output torque of the first actuator and an EPL instruction value for determining a magnitude of an output torque of the second actuator, in accordance with physical quantities including at least the vehicle speed and the vertical angle.

In a case where the vertical angle is not zero degrees, the control section increases a ratio p/q of the EPS instruction value p with respect to the EPL instruction value q as the vehicle speed increases, on condition that the physical quantities except the vehicle speed are constant.

The inventors of the present teaching studied a situation where a vertical angle reducing function using the EPS causes an incongruity sense of a rider, to find that this situation is likely to occur at a low-speed range. The inventors finally found that the vehicle speed and the limit angle at which the vehicle may maintain the vertical angle has a relationship shown in FIG. 7 in a case where a turning radius is constant.

Figure 7:
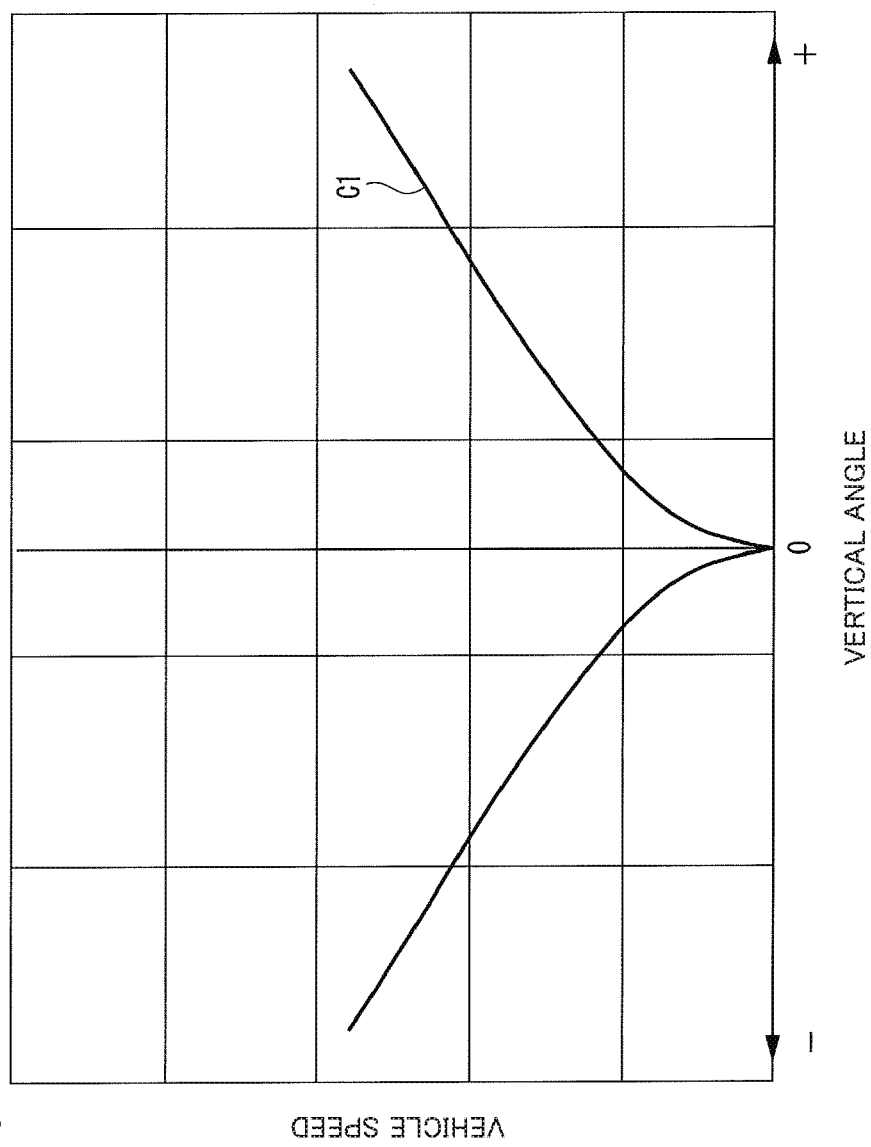
FIG. 7 A graph showing a relationship among a vertical angle, a vehicle speed, and a limit angle.

FIG. 7 is a graph showing a relationship between the vehicle speed and the limit angle. As shown in FIG. 7, the limit angle is determined in accordance with the vehicle speed. As the vehicle speed decreases, the limit angle decreases. That is, in a situation where the vehicle speed is low, the incongruity sense frequently occurs because the vertical angle reducing function needs to be frequently performed.

To suppress a behavior causing an increase of the vertical angle, it is effective to increase steering with a tiller in a direction in which the vehicle leans. For example, it is effective to increase steering rightward when the vehicle shows a behavior causing an increase of the vertical angle rightward, while increasing steering leftward when the vehicle shows a behavior causing an increase of the vertical angle leftward. In this case, the degree of change in the vertical angle in response to an operation of the steering force input section is smaller in a low-speed range than in a high-speed range, and thus, even in the case of changing the vertical angle to the same degree, the amount of the operation on the steering force input section is larger in the low-speed range than in the high-speed range. The inventors found that in a vehicle including an EPS, an incongruity sense of a rider more frequently occurs as an assist torque by the EPS increases as described above, and thus, an incongruity sense of a rider frequently occurs in a low-speed range where a large amount of the operation on the steering force input section is needed.

A vehicle having two front wheels includes a linkage mechanism in order to tilt the vehicle. The linkage mechanism includes a cross member. The cross member is supported on a body frame to enable a pivot about a linkage axis extending in a front-rear direction, and changes relative positions of the right front wheel and the left front wheel in a top-bottom direction of the body frame in accordance with a tilt of the body frame. The inventors found that a pivot force of suppressing a behavior causing an increase of the vertical angle may be exerted on this cross member. In view of this, the inventors thought that a pivot force application device (electric power leaning system: EPL) of applying a pivot force of suppressing the behavior causing an increase of the vertical angle to the cross member is mounted on the vehicle.

The use of the EPL enables a change in the vertical angle as a different operation from an operation on the steering force input section. Thus, the use of the EPL enables the vertical angle to be operated with a smaller operation on the steering force input section than in a vehicle including no EPL.

For example, in a case where the vertical angle increases rightward, the cross member pivots counterclockwise relative to the body frame when seen from a rider. In view of this, in a case where the vertical angle increases rightward, the EPL exerts a pivot force on the cross member in such a manner that the cross member pivots clockwise when seen from the rider so as to reduce the vertical angle. On the other hand, in a case where the vertical angle increases leftward, the EPL exerts a pivot force on the cross member in such a manner that the cross member pivots counterclockwise when seen from the rider so as to reduce the vertical angle.

As described above, in a case where the vehicle speed is relatively low, if only the EPS is used for reducing a behavior causing an increase of the vertical angle, incongruity sense of the rider easily occurs. In view of this, in this embodiment, an EPL instruction value is set at a large value in a low-speed range, and a larger torque is output from the EPL than that from the EPS so that the behavior causing an increase of the vertical angle may be suppressed. In this manner, an incongruity sense of the rider may be reduced in the low-speed range. In this case, the ratio p/q of the EPS instruction value p with respect to the EPL instruction value q is relatively small.

In contrast, the vehicle speed is relatively high, incongruity sense of the rider does not frequently occur even when only the EPS is used for suppressing the behavior causing an increase of the vertical angle. In view of this, in this embodiment, the EPL instruction value is not set at such a large value in a high-speed range. In this case, the ratio p/q of the EPS instruction value p with respect to the EPL instruction value q is relatively large. Since the control section sets the EPS instruction value p and the EPL instruction value q in the manner described above, the control section performs control of increasing the ratio p/q in accordance with the vehicle speed.

In the manner described above, the EPL exerts a pivot force on the cross member and does not exert a force directly on the steering force input section. Thus, an incongruity sense is less likely to occur in an operation by the rider on the steering force input section. The vehicle according to the present teaching has a tendency in which a ratio of an output of the EPS with respect to an output of the EPL in a low-speed range where suppression of a behavior causing an increase of the vertical angle only by the EPS frequently causes an incongruity sense is made higher than that in a high-speed range, and thus, an incongruity sense is less likely to occur.

(2) In the vehicle according to configuration (1) described above, the control section may perform control in such a manner that the ratio p/q gradually changes with a change in the vehicle speed.

In the vehicle having configuration (2), the change in the ratio p/q between an output torque of a first actuator and an output torque of a second actuator in accordance with the vehicle speed is gradual, and thus, an incongruity sense of a user is less likely to occur.

(3) In the vehicle having configuration (1) or (2), the control section may increase the output of the first actuator in accordance with an increase in the vehicle speed when the vehicle speed is at least within a predetermined range.

In the vehicle having configuration (3), a second steering force (assist torque) to the steering force input section increases with an increase in the vehicle speed. Since the assist torque to the steering force input section acts so as to cancel the Gyroscopic Precession (i.e., a phenomenon in which a force of the front wheels toward retaining their postures occurs) that increases with an increase in the vehicle speed, the rider may operate the steering force input section with a light feeling of operation even in a high-speed range. A four-wheel vehicle whose body does not tilt during turning generally includes an EPS in order to reduce a large steering force necessary for the case of operating a handlebar with the vehicle being stopped (i.e., to improve a stationary steering torque). Thus, an assist torque to the steering force input section is set to be large in a low-vehicle speed range, in contrast to the control according to the present teaching.

(4) In the vehicle having any one of configurations (1) through (3), the vehicle may be configured in such a manner that a steering angle of the steering force input section changes to increase or decrease when the body frame tilts.

In the vehicle having configuration (4), the tilt of the body frame and the steering angle of the steering force input section have a relationship in which the tilt of the body frame and the steering angle of the steering force input section affect each other. In such a vehicle, the presence of both the EPS and the EPL enables control of a behavior of the vehicle by compensating for each other or by cooperation therebetween.

(5) In the vehicle having any one of configurations (1) through (4), the control section may determine an output of the first actuator in accordance with the vertical angle.

As the vertical angle increases, a steering force of a rider necessary for reducing the tilt angle of the vehicle increases. Thus, as in the vehicle having configuration (5), the EPS instruction value is determined in such a manner that the EPS instruction value increases as the vertical angle increases.

(6) In the vehicle having any one of configurations (1) through (5), the physical quantities include at least one of a vertical angular velocity or a vertical angular acceleration. The control section may determine the output of the first actuator in accordance with at least one of the vertical angular velocity or the vertical angular acceleration.

The vehicle having configuration (6) may reduce a resistance to a leaning operation of the vehicle. That is, the output of the first actuator may be determined so as to avoid an incongruity sense of the rider caused by a behavior of the steering force input section due to the output of the first actuator by the control section when the rider is leaning the vehicle.

(7) In the vehicle having any one of configurations (1) through (6), the vehicle may be configured in such a manner that during traveling, the steering angle of the steering force input section changes to increase clockwise when viewed from above when the body frame tilts rightward, whereas the steering angle of the steering force input section changes to increase counterclockwise when viewed from above when the body frame tilts leftward.

In the vehicle having configuration (7), when the body frame tilts rightward during traveling, the vehicle is directed to turn rightward, for example. Then, the steering force input section also pivots clockwise to further turn the vehicle rightward. This characteristic in which when the vehicle is leaned, the steering force input section is further steered to the leaning direction is called a self-steering characteristic. A turning exerts a centrifugal force on the vehicle, and thereby, the vertical angle decreases. The technique of the present teaching including the function of enabling control of the vertical angle is preferable when being applied to a vehicle having the self-steering characteristic because this characteristic may be either enhanced or reduced depending on situations. In a situation where the output torques of both the first actuator and the second actuator are zero, the rider may operate the vehicle in the same manner as a large number of general vehicles having no actuators.

Examples of preferred embodiments will be described in detail hereinafter with reference to the accompanying drawings.

In the accompanying drawings, arrow F represents the forward direction of a vehicle. Arrow B represents the rearward direction of the vehicle. Arrow U represents the upward direction of the vehicle. Arrow D represents the downward direction of the vehicle. Arrow R represents the rightward direction of the vehicle. Arrow L represents the leftward direction of the vehicle.

The vehicle turns with the body frame being tilted in the left direction of the vehicle or in the right direction of the vehicle relative to the vertical direction. Thus, in addition to the directions relative to the vehicle, directions relative to the body frame are defined. In the accompanying drawings, arrow FF represents the forward direction of the body frame. Arrow FB represents the rearward direction of the body frame. Arrow FU represents the upward direction of the body frame. Arrow FD represents the downward direction of the body frame. Arrow FR represents the rightward direction of the body frame. Arrow FL represents the leftward direction of the body frame.

The "front-rear direction of the body frame", the "left-right direction of the body frame", and the "top-bottom direction of the body frame" herein refer to the front-rear direction, the left-right direction, and the top-bottom direction, respectively, relative to the body frame when seen from a rider driving the vehicle. In addition, "to a side of the body frame" refers to the rightward or leftward direction of the body frame.

The expression "extending in the front-rear direction of the body frame" herein includes extending with a tilt relative to the front-rear direction of the body frame, and refers to extending with a tilt close to the front-rear direction of the body frame as compared to the left-right direction and the top-bottom direction of the body frame.

The expression "extending in the left-right direction of the body frame" herein includes extending with a tilt relative to the left-right direction of the body frame, and refers to extending with a tilt close to the left-right direction of the body frame as compared to the front-rear direction and the top-bottom direction of the body frame.

The expression "extending in the top-bottom direction of the body frame" herein includes extending with a tilt relative to the top-bottom direction of the body frame, and refers to extending with a tilt close to the top-bottom direction of the body frame as compared to the front-rear direction and the left-right direction of the body frame.

The "upright state of the vehicle" herein refers to a state in which no turn made and the top-bottom direction of the body frame coincides with the vertical direction. In this state, the directions relative to the vehicle coincide with the directions relative to the body frame. In a turn while the body frame is tilted in the left direction or in the right direction relative to the vertical direction, the left-right direction of the vehicle does not coincide with the left-right direction of the body frame. In this case, the top-bottom direction of the vehicle does not coincide with the top-bottom direction of the body frame, either. However, the front-rear direction of the vehicle coincides with the front-rear direction of the body frame.

In this embodiment, a vehicle having two front wheels and one rear wheel will be described as an example of the vehicle. The "vertical angle" herein refers to an angle formed by an imaginary line extending in the top-bottom direction of the body frame relative to the vertical direction when the body frame tilts relative to the left-right direction of the body frame.

<Overall Configuration>

FIG. 1 is a side view of an overall vehicle 1 when viewed from the left of the vehicle 1. A no-load state of the vehicle 1 refers to an upright state in which the front wheels are neither turned nor tilted while a rider does not ride on the vehicle 1 and the vehicle 1 is not charged with fuel.

As illustrated in FIG. 1, the vehicle 1 includes a vehicle body 2, a pair of left and right front wheels 3 (see FIG. 2), a rear wheel 4 (second wheel), and a linkage mechanism 5. The vehicle body 2 includes a body frame 21, a body cover 22, a sheet 24, and a power unit 25.

The body frame 21 includes a head pipe 211, a down frame 212, an under frame 214, and a rear frame 213. In FIG. 1, a portion of the body frame 21 hidden by the body cover 22 is indicated by broken lines. The body frame 21 supports, for example, the power unit 25 and the sheet 24. The power unit 25 includes a driving source such as an engine or an electric motor and a transmission device, for example.

The head pipe 211 is disposed in a front portion of the vehicle 1. The head pipe 211 is slightly tilted relative to the vertical direction in such a manner that a lower portion of the head pipe 211 is located slightly behind an upper portion thereof in the side view of the vehicle 1. The linkage mechanism 5 is disposed around the head pipe 211. A steering shaft 60 is rotatably inserted in the head pipe 211. The head pipe 211 supports the linkage mechanism 5. The head pipe 211 as a part of the body frame 21 may tilt rightward of the vehicle 1 in a right turn of the vehicle 1 and may tilt leftward of the vehicle 1 in a left turn of the vehicle 1.

The down frame 212 is connected to the head pipe 211. The down frame 212 is disposed behind the head pipe 211 and extends in the top-bottom direction. The under frame 214 is connected to a lower portion of the down frame 212. The under frame 214 extends rearward from the lower portion of the down frame 212. At the rear of the under frame 214, the rear frame 213 extends rearward and upward. The rear frame 213 supports, for example, the sheet 24, the power unit 25, and a tail lamp.

The body frame 21 is covered with the body cover 22. The body cover 22 includes a front cover 221, a pair of left and right front fenders 223, a leg shield 225, a center cover 226, and a rear fender 224.

The front cover 221 is disposed ahead of the sheet 24. The front cover 221 covers at least a part of the linkage mechanism 5. The front cover 221 includes a front portion 221a disposed ahead of the linkage mechanism 5. The front portion 221a of the front cover 221 is disposed above the front wheels 3 in a side view of the vehicle 1 in the no-load state. The front portion 221a of the front cover 221 is disposed behind the front ends of the front wheels 3 in the side view of the vehicle 1 in the no-load state. The leg shield 225 is disposed below the front cover 221 and ahead of the sheet 24. The center cover 226 is disposed to cover the periphery of the rear frame 213.

The pair of left and right front fenders 223 (see FIG. 2) is disposed below the front cover 221 and above the pair of left and right front wheels 3, respectively. The rear fender 224 is disposed above a rear portion of the rear wheel 4.

The pair of left and right front wheels 3 is disposed below the head pipe 211 in the no-load state. The pair of left and right front wheels 3 is disposed below the front cover 221 in the no-load state. The rear wheel 4 is disposed below the center cover 226. The rear wheel 4 is disposed below the rear fender 224.

Figure 2:
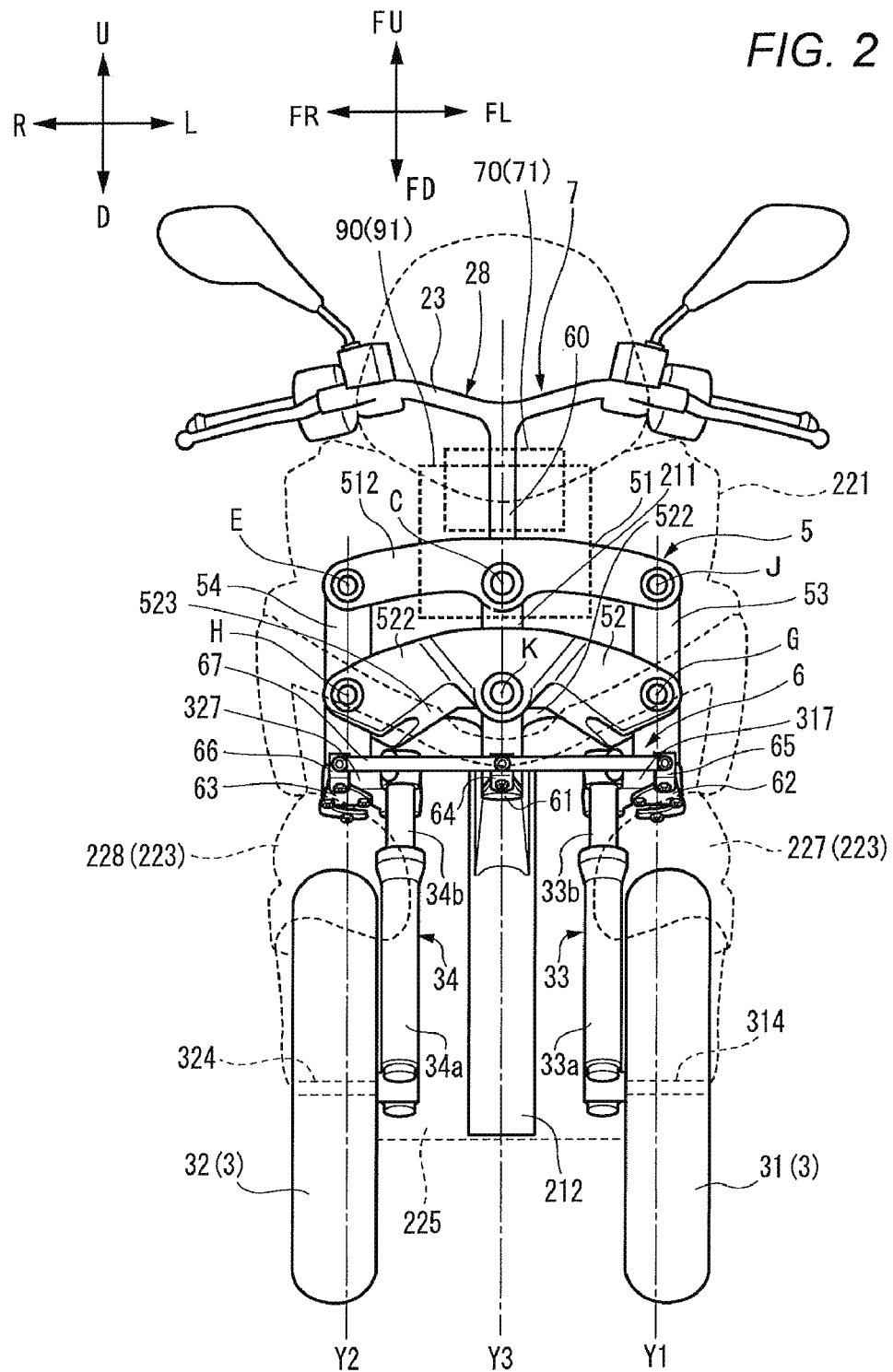
FIG. 2 A front view of a front portion of the vehicle illustrated in FIG. 1.
Figure 3:
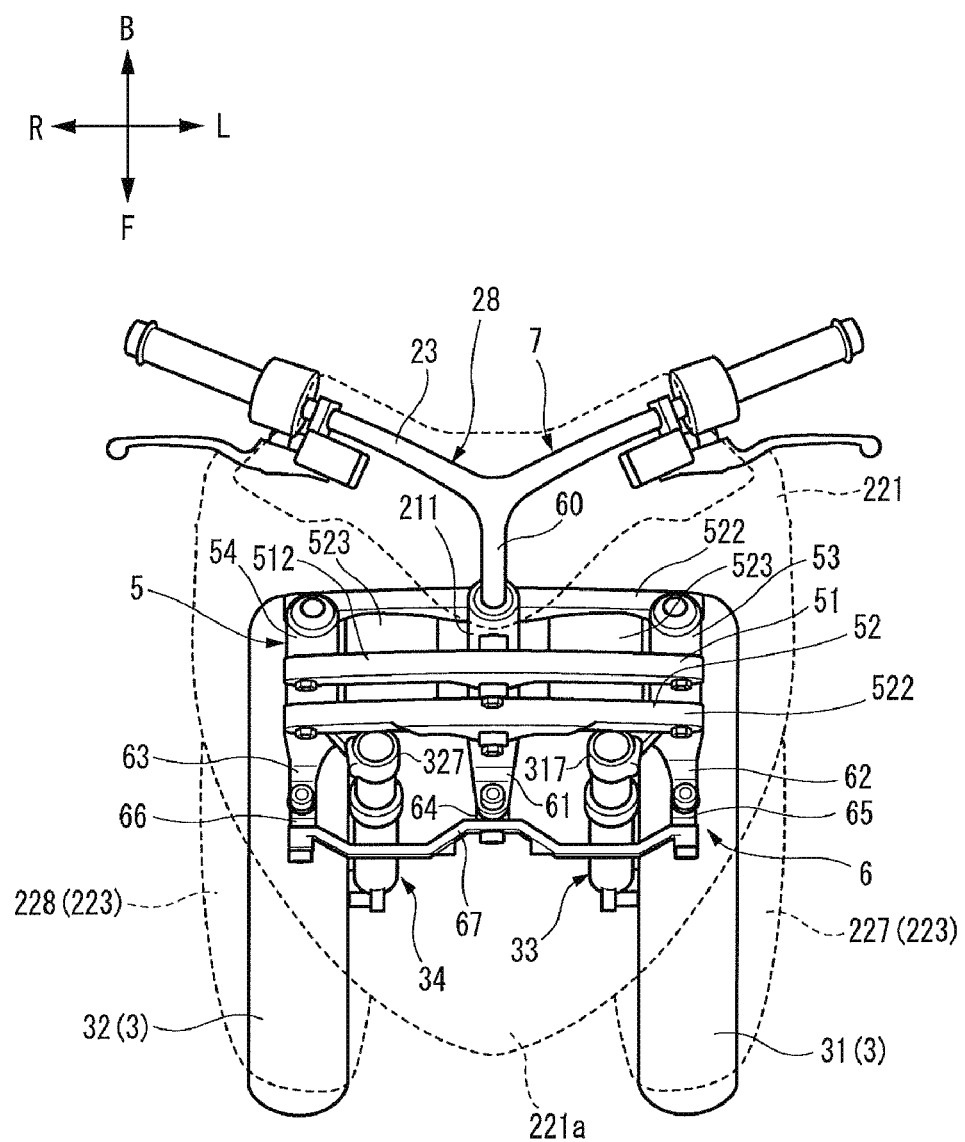
FIG. 3 A plan view of the front portion of the vehicle illustrated in FIG. 1.

FIG. 2 is a front view of a front portion of the vehicle 1 illustrated in FIG. 1 when viewed from the front. FIG. 3 is a plan view of the front portion of the vehicle 1 illustrated in FIG. 1 when viewed from above. In FIGS. 2 and 3, the body cover 22 is illustrated transparent. As illustrated in FIGS. 2 and 3, the vehicle 1 includes a steering force transfer mechanism 6, the linkage mechanism 5, a left buffer device 33, a right buffer device 34, and the pair of left and right front wheels 3. The left buffer device 33 supports a left front wheel 31 on the body frame 21. The right buffer device 34 supports a right front wheel 32 on the body frame 21.

The pair of left and right front wheels 3 includes the left front wheel 31 (first wheel) and the right front wheel 32 (third wheel). The left front wheel 31 and the right front wheel 32 are arranged side by side in the left-right direction of the body frame 21. The left front wheel 31 and the right front wheel 32 are symmetrically displaced with respect to the center in the vehicle width direction. A first front fender 227 in the pair of left and right front fenders 223 is disposed above the left front wheel 31. A second front fender 228 in the pair of left and right front fenders 223 is disposed above the right front wheel 32. The left front wheel 31 is supported by the left buffer device 33. The right front wheel 32 is supported by the right buffer device 34. As illustrated in FIG. 1, the left front wheel 31 includes a left tire 31a and a left wheel 31b that supports the left tire 31a and rotates together with a left brake disc 711. The right front wheel 32 includes a right tire 32a and a right wheel 32b that supports the right tire 32a and rotates together with a right brake disc 721.

The left buffer device 33 is a so-called telescopic buffer device, and attenuates vibrations from the road surface. A lower portion of the left buffer device 33 supports the left front wheel 31. The left buffer device 33 buffers displacement of the left front wheel 31 in the top direction of the body frame 21 or in the bottom direction of the body frame 21. The left buffer device 33 includes a first lower portion 33a and a first upper portion 33b. The left front wheel 31 is supported by the first lower portion 33a. The first lower portion 33a extends in the top-bottom direction, and a lower portion of the first lower portion 33a supports a left axle member 314. The left axle member 314 supports the left front wheel 31. The first upper portion 33b is disposed above the first lower portion 33a with a part of the first upper portion 33b being inserted in the first lower portion 33a. The first upper portion 33b is movable relative to the first lower portion 33a in the direction in which the first lower portion 33a extends. An upper portion of the first upper portion 33b is fixed to a first bracket 317.

The first lower portion 33a and the first upper portion 33b constitute two telescopic elements arranged in parallel in the front-rear direction and coupled to each other. Accordingly, rotation of the first upper portion 33b relative to the first lower portion 33a is suppressed.

The right buffer device 34 is a so-called telescopic buffer device, and attenuates vibrations from the road surface. A lower portion of the right buffer device 34 supports the right front wheel 32. The right buffer device 34 buffers displacement of the right front wheel 32 in the top direction of the body frame 21 or in the bottom direction of the body frame 21. The right buffer device 34 includes a second lower portion 34a and a second upper portion 34b. The right front wheel 32 is supported by the second lower portion 34a. The second lower portion 34a extends in the top-bottom direction, and a lower portion of the second lower portion 34a supports a right axle member 324. The right axle member 324 supports the right front wheel 32. The second upper portion 34*b* is disposed above the second lower portion 34*a* with a part of the second upper portion 34*b* being inserted in the second lower portion 34*a*. The second upper portion 34*b* is movable relative to the second lower portion 34*a* in the direction in which the second lower portion 34*a* extends. An upper portion of the second upper portion 34*b* is fixed to a second bracket 327.

The second lower portion 34*a* and the second upper portion 34*b* constitute two telescopic elements arranged in parallel in the front-rear direction and coupled to each other. Accordingly, rotation of the second upper portion 34*b* relative to the second lower portion 34*a* is suppressed.

The steering force transfer mechanism 6 is disposed above the left front wheel 31 and the right front wheel 32. The steering force transfer mechanism 6 includes a steering member 28 as a member for inputting a steering force of a rider. The steering member 28 includes a steering shaft 60 and a handlebar 23 coupled to an upper portion of the steering shaft 60. The steering shaft 60 is disposed to extend substantially in the top-bottom direction with a part of the steering shaft 60 being inserted in the head pipe 211, and is rotatable about the head pipe 211. The steering shaft 60 is caused to rotate with an operation of the handlebar 23 by the rider. The rotatable range of the steering force transfer mechanism 6 including the handlebar 23 and the steering shaft 60 is less than 360 degrees.

The steering force transfer mechanism 6 includes a first transfer plate 61, a second transfer plate 62, a third transfer plate 63, a first joint 64, a second joint 65, a third joint 66, a tie rod 67, the first bracket 317, and the second bracket 327, in addition to the steering member 28. The steering force transfer mechanism 6 transfers a steering force of operating the handlebar 23 by the rider to the first bracket 317 and the second bracket 327 through the members described above.

The first transfer plate 61 is disposed at the center in the vehicle width direction, and is nonrotatably coupled relative to the steering shaft 60. The first transfer plate 61 rotates with rotation of the steering shaft 60.

The second transfer plate 62 is rotatably coupled to a left side member 53 of the linkage mechanism 5 described later. The second transfer plate 62 is fixed to the first bracket 317. The second transfer plate 62 is disposed below the first bracket 317. The second transfer plate 62 is disposed at the left of the first transfer plate 61.

The third transfer plate 63 is rotatably coupled to a right side member 54 of the linkage mechanism 5 described later. The third transfer plate 63 and the second transfer plate 62 are symmetrically disposed in the left-right direction with respect to the first transfer plate 61. The third transfer plate 63 is fixed to the second bracket 327. The third transfer plate 63 is disposed below the second bracket 327.

The first joint 64 is disposed ahead of the first transfer plate 61. The first joint 64 is supported to be rotatable about the first transfer plate 61 by a rotary shaft member extending in the top-bottom direction. The second joint 65 is disposed ahead of the second transfer plate 62. The second joint 65 is supported to be rotatable about the second transfer plate 62 by a rotary shaft member extending in the top-bottom direction. The third joint 66 is disposed ahead of the third transfer plate 63. The third joint 66 is supported to be rotatable about the third transfer plate 63 by a rotary shaft member extending in the top-bottom direction. Each of the first joint 64, the second joint 65, and the third joint 66 includes a shaft portion extending in the front-rear direction on the front portion thereof.

The tie rod 67 is disposed to extend in the vehicle width direction. The tie rod 67 is supported to be rotatable about the shaft portions extending in the front-rear direction on the front portions of the first joint 64, the second joint 65, and the third joint 66.

The thus-configured steering force transfer mechanism 6 transfers the steering force from the steering member 28 to the tie rod 67 through the first transfer plate 61 and the first joint 64. In this manner, the tie rod 67 is displaced to one of the left or the right. The steering force transferred to the tie rod 67 is transferred from the tie rod 67 to the first bracket 317 through the second transfer plate 62 and the second joint 65. The steering force transferred to the tie rod 67 is transferred from the tie rod 67 to the second bracket 327 through the third transfer plate 63 and the third joint 66. In this manner, the first bracket 317 and the second bracket 327 rotate in the direction in which the tie rod 67 is displaced.

<Linkage Mechanism>

This embodiment employs the linkage mechanism 5 of a parallel four-bar linkage (also called parallelogram linkage) type. The linkage mechanism 5 is disposed below the handlebar 23. The linkage mechanism 5 is coupled to the head pipe 211 of the body frame 21. The linkage mechanism 5 includes an upper cross member 51, a lower cross member 52, a left side member 53, and a right side member 54, as a configuration for performing a tilt operation of the vehicle 1. The linkage mechanism 5 includes the first bracket 317 and the left buffer device 33, as a configuration that is connected to a lower portion of the left side member 53 and tilts together with the left side member 53. The linkage mechanism 5 also includes the second bracket 327 and the right buffer device 34, as a configuration that is connected to a lower portion of the right side member 54 and tilts together with the right side member 54.

The right side member 54 supports an upper portion of the right buffer device 34 in such a manner that the right buffer device 34 is rotatable about a right steering axis Y2 extending in the top-bottom direction of the body frame 21. The left side member 53 supports an upper portion of the left buffer device 33 in such a manner that the left buffer device 33 is rotatable about a left steering axis Y1 parallel to the right steering axis Y2. The right end of the upper cross member 51 is coupled to an upper portion of the right side member 54 to be rotatable about an upper right axis E extending in the front-rear direction of the body frame 21. The left end of the upper cross member 51 is coupled to an upper portion of the left side member 53 to be rotatable about an upper left axis J parallel to the upper right axis E. An intermediate portion of the upper cross member 51 is coupled to the body frame 21 to be rotatable about an upper intermediate axis (an example of a linkage axis) C parallel to the upper right axis E and the upper left axis J. The right end of the lower cross member 52 is coupled to a lower portion of the right side member 54 to be rotatable about a lower right axis H parallel to the upper right axis E. The left end of the lower cross member 52 is coupled to a lower portion of the left side member 53 to be rotatable about a lower left axis G parallel to the upper left axis J. An intermediate portion of the lower cross member 52 is coupled to the body frame 21 to be rotatable about a lower intermediate axis K parallel to the upper intermediate axis C.

The upper cross member 51 includes a plate-shaped member 512 disposed ahead of the head pipe 211 and extending in the vehicle width direction. The plate-shaped member 512 is coupled to the head pipe 211 by a support part and is rotatable relative to the head pipe 211 about the upper intermediate axis C extending substantially in the front-rear direction. The left end of the upper cross member 51 is coupled to the left side member 53 by a coupling part. The upper cross member 51 is rotatable relative to the left side member 53 about the upper left axis J extending substantially in the front-rear direction. The right end of the upper cross member 51 is coupled to the right side member 54 by a coupling part. The upper cross member 51 is rotatable relative to the right side member 54 about the upper right axis E extending substantially in the front-rear direction.

The lower cross member 52 is coupled to the head pipe 211 by a support part and is rotatable about the lower intermediate axis K extending substantially in the front-rear direction. The lower cross member 52 is disposed below the upper cross member 51. The lower cross member 52 has substantially the same length in the vehicle width direction as that of the upper cross member 51, and is disposed in parallel with the upper cross member 51.

The lower cross member 52 includes a pair of plate-shaped members 522 and 522 extending in the vehicle width direction. The pair of plate-shaped members 522 and 522 is disposed such that the head pipe 211 is disposed between the pair of plate-shaped members 522 and 522 in the front-rear direction. The pair of plate-shaped members 522 and 522 is integrally coupled to each other by an intermediate portion 523. The intermediate portion 523 may be formed integrally with the pair of plate-shaped members 522 and 522. The intermediate portion 523 may be formed of a different member coupling the pair of plate-shaped members 522 and 522 to each other. The left end of the lower cross member 52 is coupled to the left side member 53 by a coupling part. The lower cross member 52 is rotatable relative to the left side member 53 about the lower left axis G extending substantially in the front-rear direction. The right end of the lower cross member 52 is coupled to the right side member 54 by a coupling part. The lower cross member 52 is rotatable relative to the right side member 54 about the lower right axis H extending substantially in the front-rear direction.

The left side member 53 is disposed at the left of the head pipe 211 and extends in parallel with the direction in which the head pipe 211 extends. The left side member 53 is disposed above the left front wheel 31. The left side member 53 is disposed above the left buffer device 33. A lower portion of the left side member 53 is coupled to the first bracket 317. The left side member 53 is attached to the first bracket 317 to be rotatable about the left steering axis Y1.

The right side member 54 is disposed at the right of the head pipe 211 and extends in parallel with the direction in which the head pipe 211 extends. The right side member 54 is disposed above the right front wheel 32. The right side member 54 is disposed above the right buffer device 34. A lower portion of the right side member 54 is coupled to the second bracket 327. The right side member 54 is attached to the second bracket 327 to be rotatable about the right steering axis Y2.

In the manner described above, the upper cross member 51, the lower cross member 52, the left side member 53, and the right side member 54 are coupled to each other in such a manner that the upper cross member 51 and the lower cross member 52 are kept to be parallel to each other. The upper cross member 51, the lower cross member 52, the left side member 53, and the right side member 54 are coupled to each other in such a manner that the left side member 53 and the right side member 54 are kept to be parallel to each other.

<Steering Operation>

Figure 4:
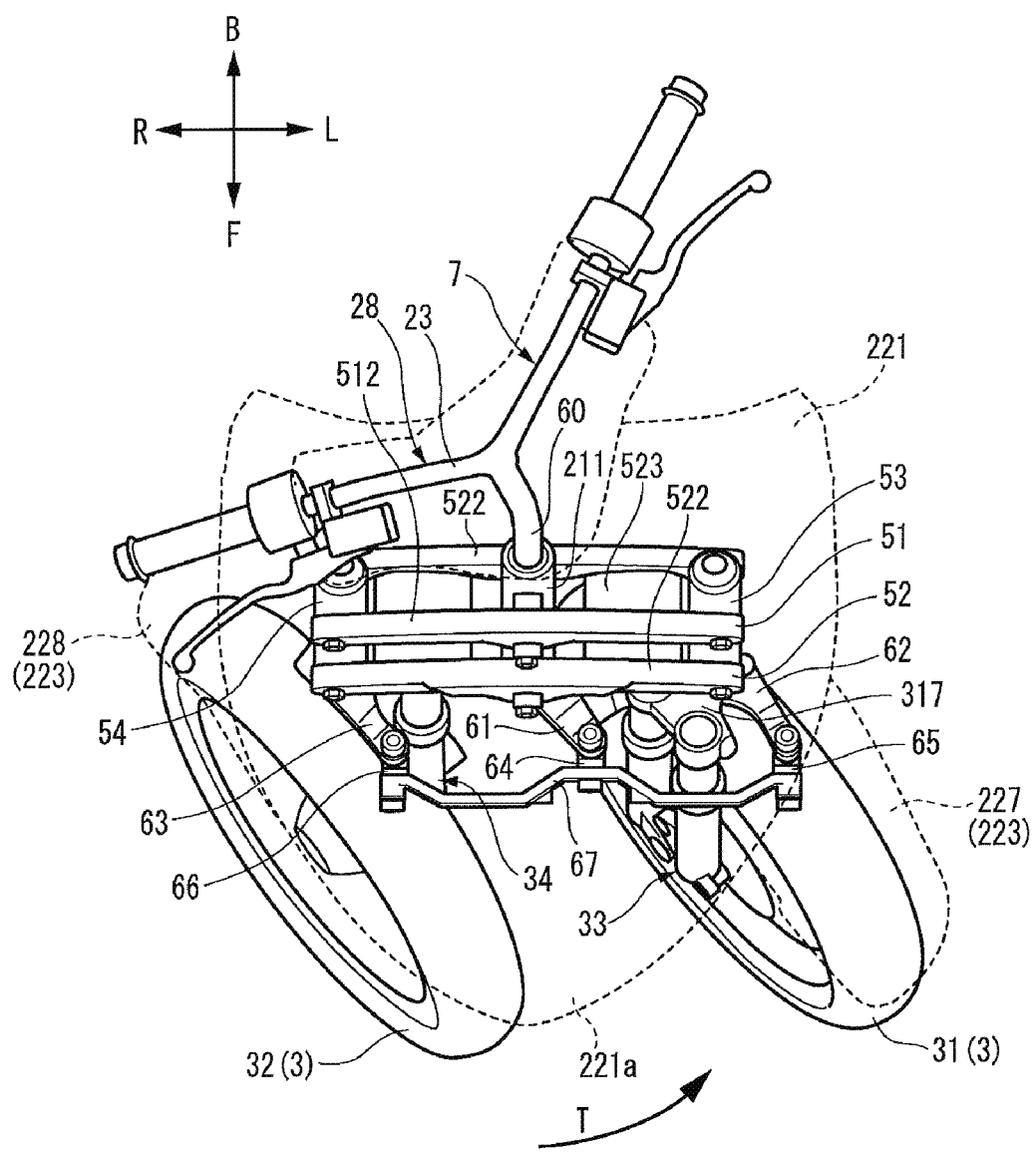
FIG. 4 A plan view of the vehicle front portion in a state where the vehicle illustrated in FIG. 1 is turned.

FIG. 4 is a view for describing a steering operation of the vehicle 1, and is a plan view of a front portion of the vehicle 1 in a state where the vehicle 1 is turned. As illustrated in FIG. 4, when the handlebar 23 is turned in the left direction or in the right direction, the steering force transfer mechanism 6 operates, and a steering operation is performed. When the rotation of the handlebar 23 causes the steering shaft 60 to rotate, the first transfer plate 61 rotates together with the rotation of the steering shaft 60. For example, when the steering shaft 60 rotates in the direction indicated by arrow T in FIG. 4 (first rotation), the first transfer plate 61 rotates in the direction indicated by arrow T. With the rotation of the first transfer plate 61 in the direction indicated by arrow T, the tie rod 67 moves left-rearward. At this time, the first transfer plate 61 rotates relative to the first joint 64 by a rotary shaft member included in the first joint 64 and extending substantially in the top-bottom direction. When the first transfer plate 61 rotates relative to the first joint 64, the tie rod 67 moves left-rearward while maintaining its posture. With the left-rearward movement of the tie rod 67, the second transfer plate 62 pivots about the left side member 53 in the direction indicated by arrow T. With the left-rearward movement of the tie rod 67, the third transfer plate 63 pivots about the right side member 54 in the direction indicated by arrow T. At this time, the second transfer plate 62 rotates relative to the second joint 65 about a rotary shaft member included in the second joint 65 and extending in the top-bottom direction. The third transfer plate 63 rotates relative to the third joint 66 about a rotary shaft member included in the third joint 66 and extending in the top-bottom direction.

When the second transfer plate 62 rotates in the direction indicated by arrow T, the first bracket 317 rotates in the direction indicated by arrow T. When the third transfer plate 63 rotates in the direction indicated by arrow T, the second bracket 327 rotates in the direction indicated by arrow T. When the first bracket 317 rotates in the direction indicated by arrow T, the left front wheel 31 rotates about the left steering axis Y1 (see FIG. 2) with the left buffer device 33 interposed therebetween. When the second bracket 327 rotates in the rotation indicated by arrow T, the right front wheel 32 rotates about the right steering axis Y2 (see FIG. 2) with the right buffer device 34 interposed therebetween.

<Tilt Operation>

Figure 5:
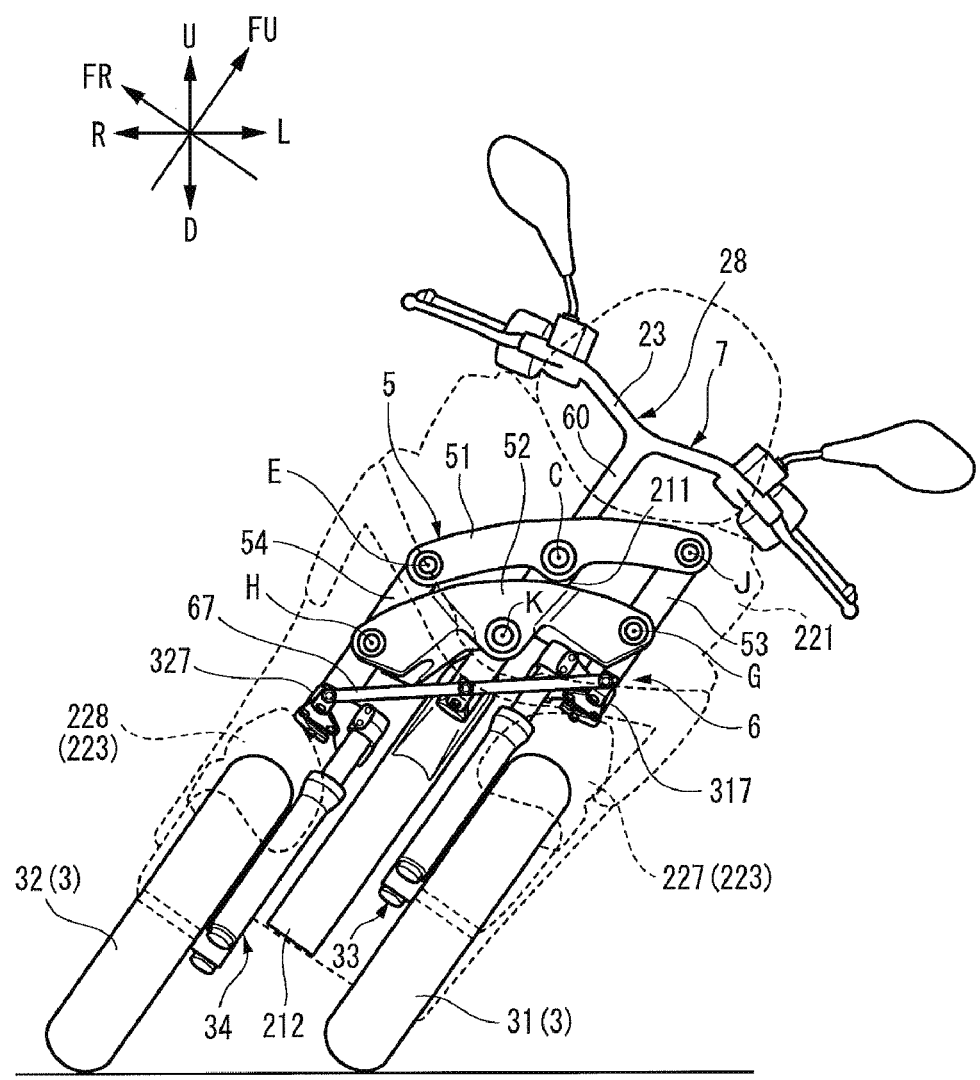
FIG. 5 A front view of the vehicle front portion in a state where the vehicle illustrated in FIG. 1 is tilted.

FIG. 5 is a view for describing a tilt operation of the vehicle 1, and is a front view of a front portion of the vehicle 1 in a state where the vehicle 1 is tilted. As illustrated in FIG. 5, with an operation of the linkage mechanism 5, the vehicle 1 tilts in the left direction or in the right direction. The operation of the linkage mechanism 5 refers to a change in the shape of the linkage mechanism 5 caused by relative rotation of members for performing a tilt operation of the linkage mechanism 5 (i.e., the upper cross member 51, the lower cross member 52, the left side member 53, and the right side member 54) about their coupling points. In the linkage mechanism 5 according to this embodiment in the upright state, the upper cross member 51, the lower cross member 52, the left side member 53, and the right side member 54 are arranged to form a substantially rectangular shape in front view. In the linkage mechanism 5 according to this embodiment, the upper cross member 51, the lower cross member 52, the left side member 53, and the right side member 54 are deformed to be a substantially parallelogram in a state where the vehicle 1 tilts. The linkage mechanism 5 performs a tilt operation in cooperation with relative rotation operations of the upper cross member 51, the lower cross member 52, the left side member 53, and the right side member 54. The tilt operation of the linkage mechanism 5 causes the left front wheel 31 and the right front wheel 32 to tilt in the left direction of the body frame or in the right direction of the body frame.

For example, when the rider tilts the vehicle 1 leftward, the head pipe 211 tilts leftward of the vehicle 1 relative to the vertical direction. When the head pipe 211 tilts leftward, the upper cross member 51 rotates rightward about the upper intermediate axis C relative to the head pipe 211. When the head pipe 211 tilts leftward, the lower cross member 52 rotates rightward about the lower intermediate axis K relative to the head pipe 211. In this manner, the upper cross member 51 moves leftward of the lower cross member 52. The left side member 53 and the right side member 54 tilt leftward relative to the vertical direction while maintaining states parallel to the head pipe 211. When the left side member 53 and the right side member 54 tilt leftward, the left side member 53 and the right side member 54 rotate relative to the upper cross member 51 and the lower cross member 52. Thus, when the vehicle 1 is tilted, the left side member 53 and the right side member 54 tilt. With the tilts of the left side member 53 and the right side member 54, the left front wheel 31 and the right front wheel 32 supported by the left side member 53 and the right side member 54 respectively tilt while maintaining states parallel to the head pipe 211 relative to the vertical direction.

In the tilt operation, the tie rod 67 rotates about the shaft portions of the first joint 64, the second joint 65, the third joint 66 extending in the front-rear direction. Accordingly, even when the vehicle 1 tilts, the tie rod 67 maintains a state parallel to the upper cross member 51 and the lower cross member 52.

In the manner described above, the linkage mechanism 5 that causes the left front wheel 31 and the right front wheel 32 to tilt by performing the tilt operation is disposed above the left front wheel 31 and the right front wheel 32. That is, the rotation axes of the upper cross member 51, the lower cross member 52, the left side member 53, and the right side member 54 as rotation members constituting the linkage mechanism 5 are disposed above the left front wheel 31 and the right front wheel 32.

<Steering Operation+Tilt Operation>

Figure 6:
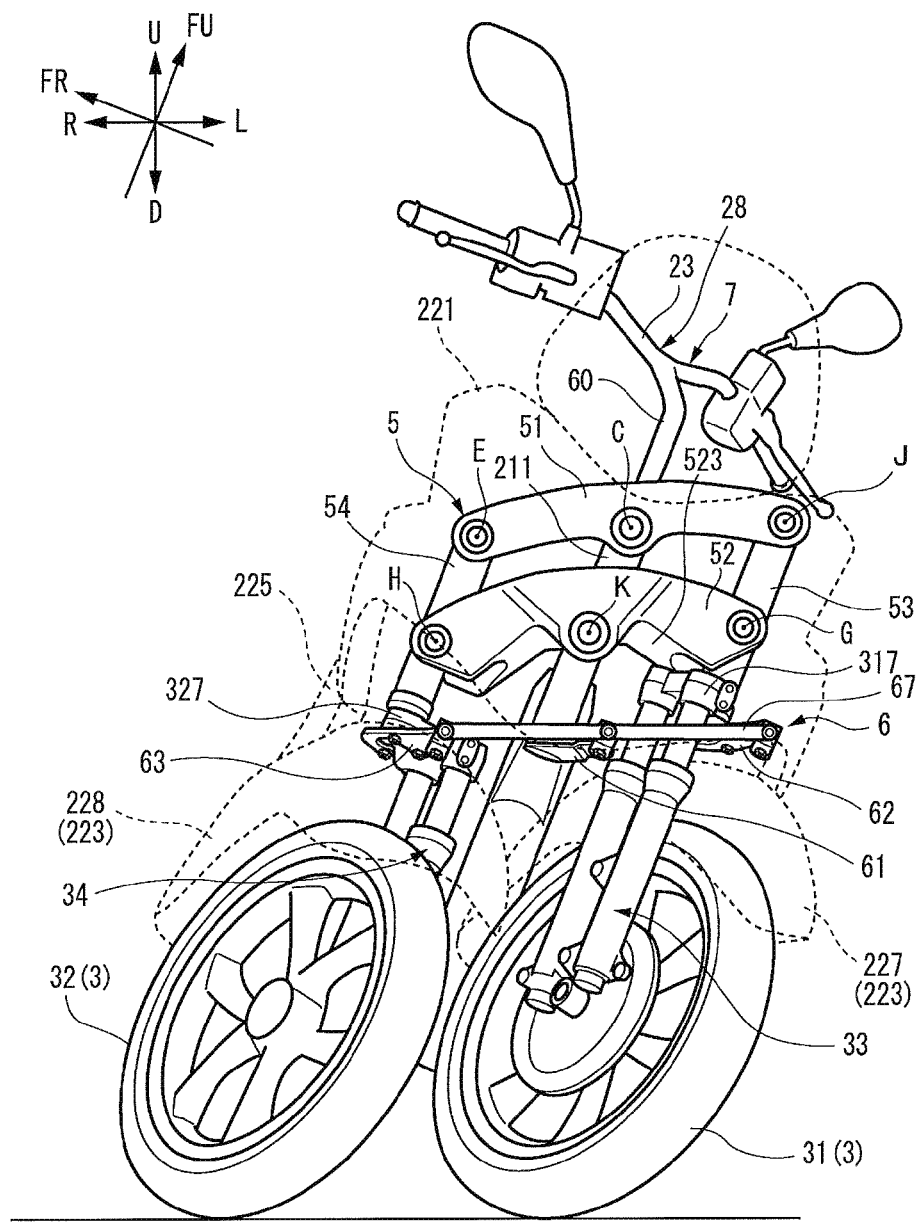
FIG. 6 A front view of the vehicle front portion in a state where the vehicle illustrated in FIG. 1 is turned and tilted.

FIG. 6 is a front view of a front portion of the vehicle 1 in a state where the vehicle 1 is turned and tilted. FIG. 6 illustrates a state where the handlebar 23 is steered leftward to cause the vehicle 1 to tilt leftward. In an operation illustrated in FIG. 6, the orientations of the left front wheel 31 and the right front wheel 32 are changed by a steering operation, and the left front wheel 31 and the right front wheel 32 are tilted together with the body frame 21 by a tilt operation. In this state, the upper cross member 51, the lower cross member 52, the left side member 53, and the right side member 54 of the linkage mechanism 5 are deformed to be a substantially parallelogram, and move rearward and in the direction in which the tie rod 67 is steered leftward or rightward (leftward in FIG. 6).

The linkage mechanism 5 tilts the body frame 21 leftward based on a first rotation of the steering shaft 60 turning the vehicle 1 leftward in a left-right direction of the vehicle 1, and tilts the body frame 21 rightward based on a second rotation of the steering shaft 60 turning the vehicle 1 rightward in the left-right direction of the vehicle 1.

<Electric Power Steering System: EPS>

As illustrated in FIGS. 1 and 2, the vehicle 1 according to this embodiment includes an electric power steering system (hereinafter referred to as an EPS) 70 capable of rotating the steering shaft 60 by a first actuator 71 such as a motor. The EPS 70 assists a steering force (an example of a first steering force) of a rider input to the handlebar 23 (an example of the steering force input section) coupled to the steering shaft 60.

One end of the first actuator 71 of the EPS 70 is fixed to the body frame 21. The other end of the first actuator 71 configured to be displaced with respect to the one end of the first actuator is fixed to the steering shaft 60 or a member configured to be displaced together with the steering shaft 60. Accordingly, the EPS 70 exerts a force of rotating the steering shaft 60 or a force of stopping the rotation (a force of applying resistance to rotation) to the body frame 21.

In a vehicle having two front wheels as the vehicle described in Patent Document 1, the number of ground points is larger than that in a vehicle having one front wheel, and thus, a large steering force is needed. In view of this, the inventors conceived that an electric power steering (EPS 70: electric power steering system, an example of the steering force application device) capable of assisting a steering force is mounted on the vehicle 1. During traveling of the vehicle 1, when the body frame 21 tilts rightward, the steering angle of the handlebar changes to increase clockwise when viewed from above. During traveling of the vehicle 1, when the body frame 21 tilts leftward, the steering angle of the handlebar changes to increase counterclockwise when viewed from above.

The inventors also found that the use of the EPS 70 may additionally provide a vertical angle reducing function of the vehicle 1. As the vertical angle reducing function, a steering force of reducing the vertical angle is applied by the EPS 70 when a behavior causing an increase of the vertical angle of the vehicle 1 appears. The vertical angle reducing function is a function of suppressing the behavior causing an increase of the vertical angle of the vehicle 1. The vertical angle is an angle formed by an imaginary line extending in the top-bottom direction of the body frame 21 relative to the vertical direction in the left-right direction of the vehicle 1.

Specifically, in suppressing a behavior causing an increase of the vertical angle rightward during traveling, a force of reducing the vertical angle may be exerted on the vehicle 1 by turning the right front wheel 32 and the left front wheel 31 clockwise (steering rightward) when viewed from above. In suppressing a behavior causing an increase of the vertical angle leftward during traveling, a force of reducing the vertical angle may be exerted on the vehicle 1 by turning the right front wheel 32 and the left front wheel 31 counterclockwise (steering leftward) when viewed from above.

However, in obtaining the vertical angle reducing function using the EPS 70, the EPS 70 may operate in some cases in spite of no steering operation by the rider, for example. In obtaining the vertical angle reducing function using the EPS 70, the EPS 70 may operate the handlebar 23 by a manipulated variable or more in response to a steering operation by the rider in some cases. In obtaining the vertical angle reducing function with the EPS 70, the EPS 70 may fail to operate the handlebar 23 in response to a steering operation by the rider in some cases. In these cases, the operation of the EPS 70 for reducing the vertical angle is exerted in such a manner that the rider feels the operation of the EPS 70 as disturbance of the handlebar 23, and thus, an incongruity sense of the rider may arise.

In view of this, this embodiment provides the vehicle 1 including the EPS 70 that obtains the vertical angle reducing function and is less likely to cause an incongruity sense of the rider.

The inventors studied a situation where an incongruity sense of a rider occurs to find that this situation is likely to occur in a low-speed range. The inventors finally found that the vehicle speed and the limit angle at which the vehicle 1 may maintain the vertical angle has a relationship shown in FIG. 7.

FIG. 7 is a graph showing a relationship between the vehicle speed and the limit angle. In FIG. 7, while the vehicle 1 is turning with a specific turning radius, for example, the vertical angle may be easily maintained in a region above a curve C1 (i.e., the vehicle speed is higher or the vertical angle is smaller than the curve C1), whereas the vertical angle may not be maintained in a region below the curve C1 (i.e., the vehicle speed is lower or the vertical angle is larger than the curve C1). As shown in FIG. 7, the limit angle is determined in accordance with the vehicle speed. As the vehicle speed decreases, the limit angle decreases. That is, in a situation where the vehicle speed is low, the incongruity sense frequently occurs because the vertical angle reducing function needs to be frequently performed.

To suppress the behavior causing an increase of the vertical angle, it is effective to increase steering with the tiller (handlebar 23) in the direction in which the vehicle 1 leans. For example, it is effective to increase steering rightward when the vehicle 1 shows a behavior causing an increase of the vertical angle rightward, while increasing steering leftward when the vehicle 1 shows a behavior causing an increase of the vertical angle leftward. In this case, the degree of change in the vertical angle in response to an operation of the handlebar 23 is smaller in a low-speed range than in a high-speed range, and thus, even in the case of changing the vertical angle to the same degree, the amount of the operation on the handlebar is larger in the low-speed range than in the high-speed range. In the vehicle 1 including the EPS 70, an incongruity sense of the rider is more likely to occur when an assist torque by the EPS 70 increases as described above. The inventors found that in the vehicle 1 including the EPS 70, an incongruity sense of the rider is likely to occur in a low-speed range where a large amount of the operation on the handlebar 23 is needed.

In the vehicle 1 including the two front wheels according to this embodiment, the linkage mechanism 5 is mounted in order to tilt the vehicle 1. The linkage mechanism 5 includes the upper cross member 51. The upper cross member 51 is supported on the body frame 21 to be rotatable about a linkage axis extending in the front-rear direction. In accordance with a tilt of the body frame 21 with rotation of the upper cross member 51, relative positions of the right front wheel 32 and the left front wheel 31 in the top-bottom direction of the body frame 21 are changed. The inventors found that a rotary force of suppressing the behavior causing an increase of the vertical angle may be exerted on this upper cross member 51. Thus, as described below, the inventors conceived that an electric power leaning system (hereinafter referred to as an EPL, an example of a rotary force application device) 90 of exerting a rotary force of suppressing the behavior causing an increase of the vertical angle on the upper cross member 51 is mounted on the vehicle 1.

<Electric Power Leaning System: EPL>

As illustrated in FIGS. 1 and 2, the vehicle 1 according to this embodiment includes an EPL 90 that actuates the linkage mechanism 5 by a second actuator 91 such as a motor. One end of the second actuator 91 of the EPL 90 is fixed to the body frame 21. The other end of the second actuator 91 configured to be displaced with respect to the one end is fixed to the upper cross member 51. Accordingly, the EPL 90 exerts a force of rotating the upper cross member 51 or a force of stopping rotation (a force of applying resistance to rotation) to the body frame 21. These forces are rotating forces to the linkage mechanism 5.

Figure 8:
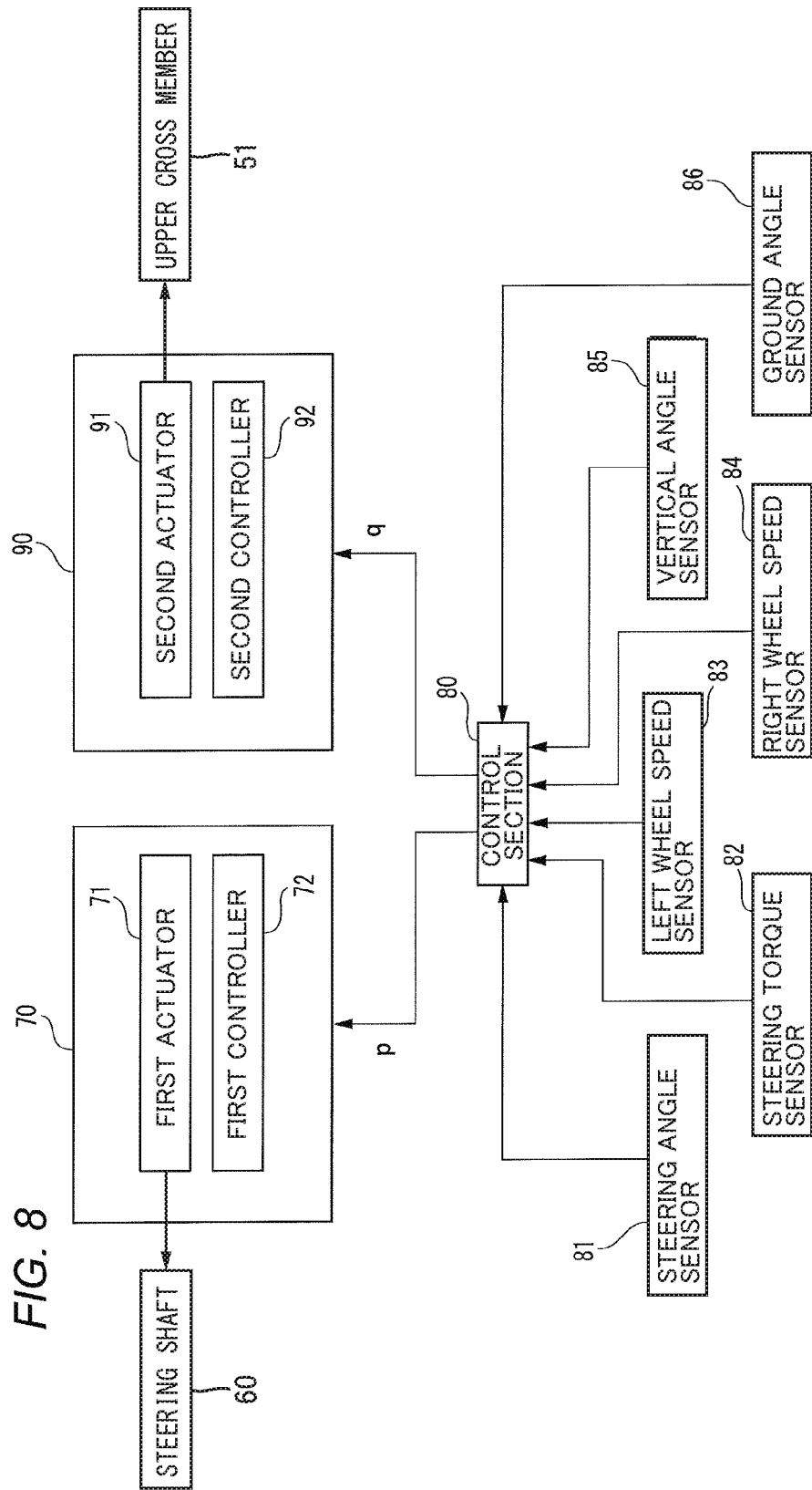
FIG. 8 A control block diagram of an EPS and an EPL.

FIG. 8 is a block diagram in driving the EPS 70 and the EPL 90. As illustrated in FIG. 8, the vehicle 1 includes a steering angle sensor 81, a steering torque sensor 82, a left wheel speed sensor 83, a right wheel speed sensor 84, a vertical angle sensor 85, a ground angle sensor 86, and a control section 80. Each of these sensors 81 through 86 is electrically connected to the control section 80.

The steering angle sensor 81 transmits an electrical signal in accordance with a steering angle that is a rotation angle of the handlebar 23, to the control section 80. The control section 80 calculates a steering angle from an output of the steering angle sensor 81. The control section 80 differentiates the output of the steering angle sensor 81 with respect to time to thereby calculate a steering angular velocity. The control section 80 further differentiates the steering angular velocity with respect to time to thereby calculate a steering angular acceleration. The steering torque sensor 82 transmits an electrical signal in accordance with a steering force input to the handlebar 23, to the control section 80. The control section 80 differentiates the output of the steering torque sensor 82 with respect to time to thereby calculate a derivative value of a steering torque.

The left wheel speed sensor 83 transmits an electrical signal in accordance with a rotation speed of the left front wheel 31, to the control section 80. The right wheel speed sensor 84 transmits an electrical signal in accordance with a rotation speed of the right front wheel 32, to the control section 80. The control section 80 calculates a vehicle speed from an output of the left wheel speed sensor 83 and an output of the right wheel speed sensor 84.

The vertical angle sensor 85 transmits an electrical signal in accordance with a left-right tilt angle of the vehicle 1 with respect to the vertical direction, to the control section 80. For example, the vertical angle sensor 85 outputs an electrical signal in accordance with a left-right tilt angle of the head pipe 211 with respect to the gravity direction. For example, the vertical angle sensor 85 may be a known gyro sensor. The control section 80 calculates a vertical angle from an output of the vertical angle sensor 85. The control section 80 differentiates an output of the vertical angle sensor 85 with respect to time to thereby calculate a vertical angular velocity. Alternatively, a vertical angular velocity sensor may be used for detecting a vertical angular velocity. The control section 80 differentiates the vertical angular velocity with respect to time to thereby calculate a vertical angular acceleration.

The ground angle sensor 86 transmits an electrical signal in accordance with a left-right tilt angle of the vehicle 1 with respect to the vertical direction to the road surface, to the control section 80. For example, as described above, the upper cross member 51 always keeps a posture parallel to the road surface. The ground angle sensor 86 detects a rotation angle of the upper cross member 51 relative to the head pipe 211 to thereby output an electrical signal in accordance with a left-right tilt angle of the vehicle 1 with respect to the vertical direction to the road surface. The control section 80 calculates a ground angle from an output of the ground angle sensor 86.

The control section 80 outputs an EPS instruction value p to the EPS 70. The control section 80 outputs an EPL instruction value q to the EPL 90. The EPS 70 includes a first controller 72 and the first actuator 71. The first controller 72 supplies a current to the first actuator 71 so as to obtain an output torque in accordance with the EPS instruction value p. The EPL 90 includes a second controller 92 and the second actuator 91. The second controller 92 supplies a current to the second actuator 91 so as to obtain an output torque in accordance with the EPL instruction value q. In this embodiment, the control section 80 determines the EPS instruction value p and the EPL instruction value q in the following manner.

Figure 9:
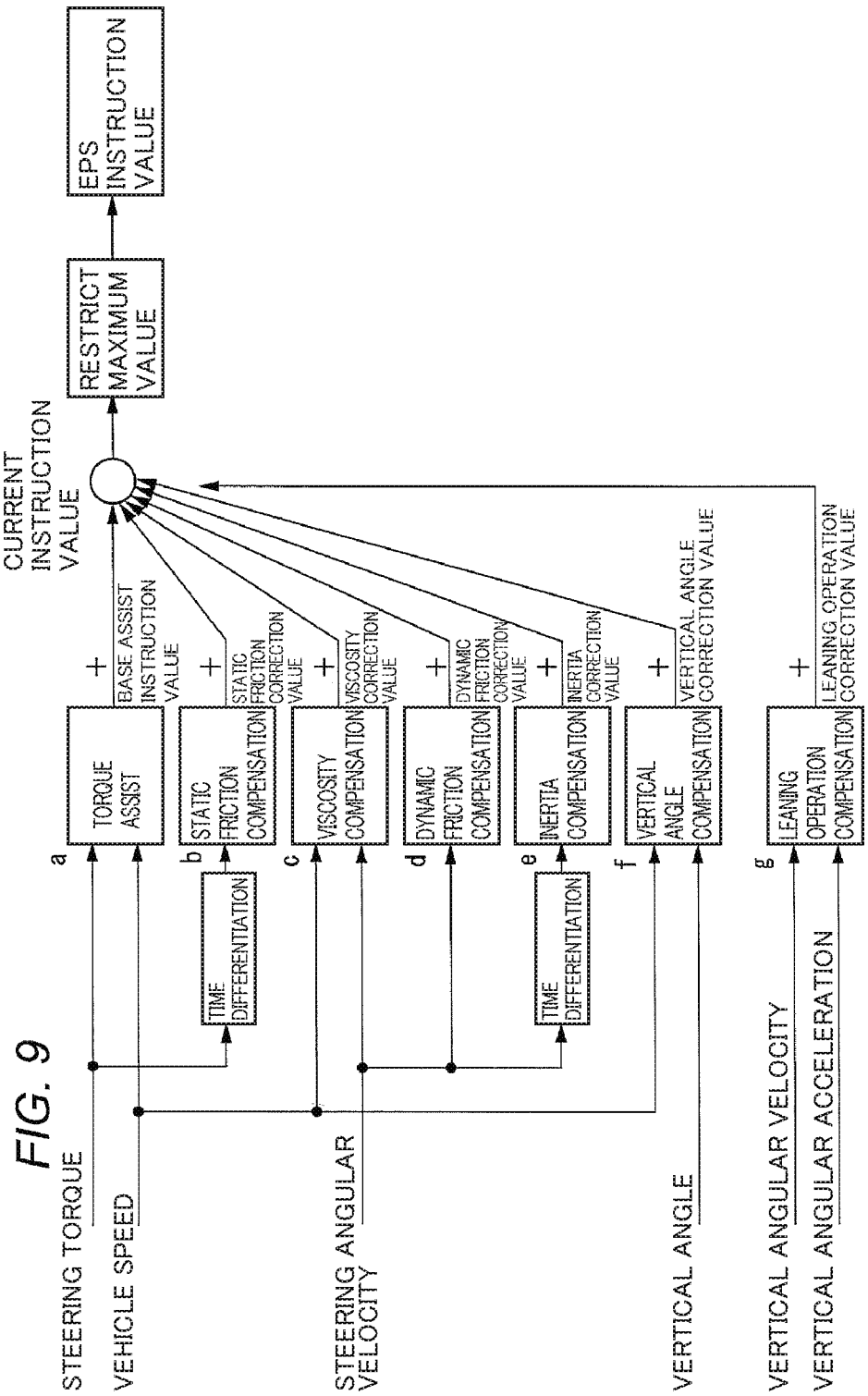
FIG. 9 A schematic view illustrating an example of control of the EPS.

The control section 80 determines the EPS instruction value p in accordance with a steering angle, a steering torque, a vehicle speed, a vertical angle, a ground angle, an angular velocity of a vertical angle, and so forth. FIG. 9 is a schematic view illustrating an example of control showing a method for calculating an EPS instruction value p. As shown in FIG. 9, the control section 80 may determine the EPS instruction value p based on (a) through (g) as follows:

(a) The control section 80 determines a base assist instruction value in accordance with a steering torque and a vehicle speed, for example. In a case where a rider inputs a large steering torque to the handlebar 23, this means that the rider intends to increase a turning angle. As the vehicle speed increases, the Gyroscopic Precession by the front wheels 3 (the left front wheel 31 and the right front wheel 32) increases, and a larger force is needed for rotating the handlebar 23. In view of this, the base assist instruction value is determined in such a manner that the base assist instruction value increases as the steering torque and the vehicle speed increase.

(b) The control section 80 determines a static friction correction value in accordance with a time derivative value of a steering torque, for example. The control section 80 determines a static friction correction value in such a manner that the static friction correction value increases as the time derivative value of the steering torque increases, for example. The increase in the static friction correction value may compensate for a static friction force. The static friction force here refers to a static friction force that occurs between mechanical elements on a transfer path of a force from the handlebar 23 to which a steering force input by the rider is transferred to the left front wheel 31 and the right front wheel 32.

(c) The control section 80 determines a viscosity correction value in accordance with the vehicle speed and a steering angular velocity, for example. The control section 80 determines a viscosity correction value in such a manner that the viscosity correction value increases as the vehicle speed and the steering angular velocity increase, for example. The addition of the viscosity correction value may provide a viscosity resistance to an operation on the handlebar 23 by the rider. The viscosity resistance here refers to a resistance spuriously generated by the first actuator 71 in response to an operation by the rider. FIG. 9 shows a configuration in which the viscosity correction value is added to a current instruction value in the same manner as (a) and (b) described above and (d) through (g) described below, and the viscosity compensation has a negative coefficient. The viscosity compensation acts as a damping force to the operation of the handlebar 23 by the rider, as the viscosity resistance.

(d) The control section 80 determines a dynamic friction correction value in accordance with a steering angular velocity, for example. The control section 80 determines a dynamic friction correction value in such a manner that the dynamic friction correction value increases as the steering angular velocity increases, for example. The addition of the dynamic friction correction value may compensate for a dynamic friction force. The dynamic friction force here refers to a dynamic friction force that occurs between mechanical elements on a transfer path of a force from the handlebar 23 to which a steering force input by the rider is transferred to the left front wheel 31 and the right front wheel 32.

(e) The control section 80 determines an inertia correction value in accordance with a steering angular acceleration obtained by differentiating the steering angular velocity with respect to time, for example. The control section 80 determines an inertia correction value in such a manner that the inertia correction value increases as the steering angular acceleration increases, for example. The addition of the inertia correction value may compensate for an inertial force of the first actuator 71. The compensation for the inertial force of the first actuator 71 may show a steering feeling similar to a feeling in which the first actuator 71 is not mounted on the vehicle 1.

(f) The control section 80 may determine a vertical angle correction value in accordance with the vehicle speed and a vertical angle, for example. As the vertical angle increases, it becomes more difficult to reduce the tilt angle of the vehicle 1. Thus, the vertical angle correction value is determined in such a manner that the vertical angle correction value increases as the vertical angle increases.

(g) The control section 80 may determine a leaning operation correction value in accordance with a vertical angular velocity and a vertical angular acceleration, for example. For example, the control section 80 may determine a leaning operation correction value in accordance with the vertical angular velocity and the vertical angular acceleration in order to reduce, for example, a resistance component of the upper cross member 51 to the head pipe 211 that obtains a leaning operation.

The control section 80 obtains the sum of the values calculated by (a) through (g) to calculate a final EPS instruction value p. At this time, if the upper limit is set for a current value that may be input to the first actuator 71, the control section 80 determines the EPS instruction value p in such a manner that a value smaller than the maximum current value input to the first actuator 71 is output.

Figure 10:
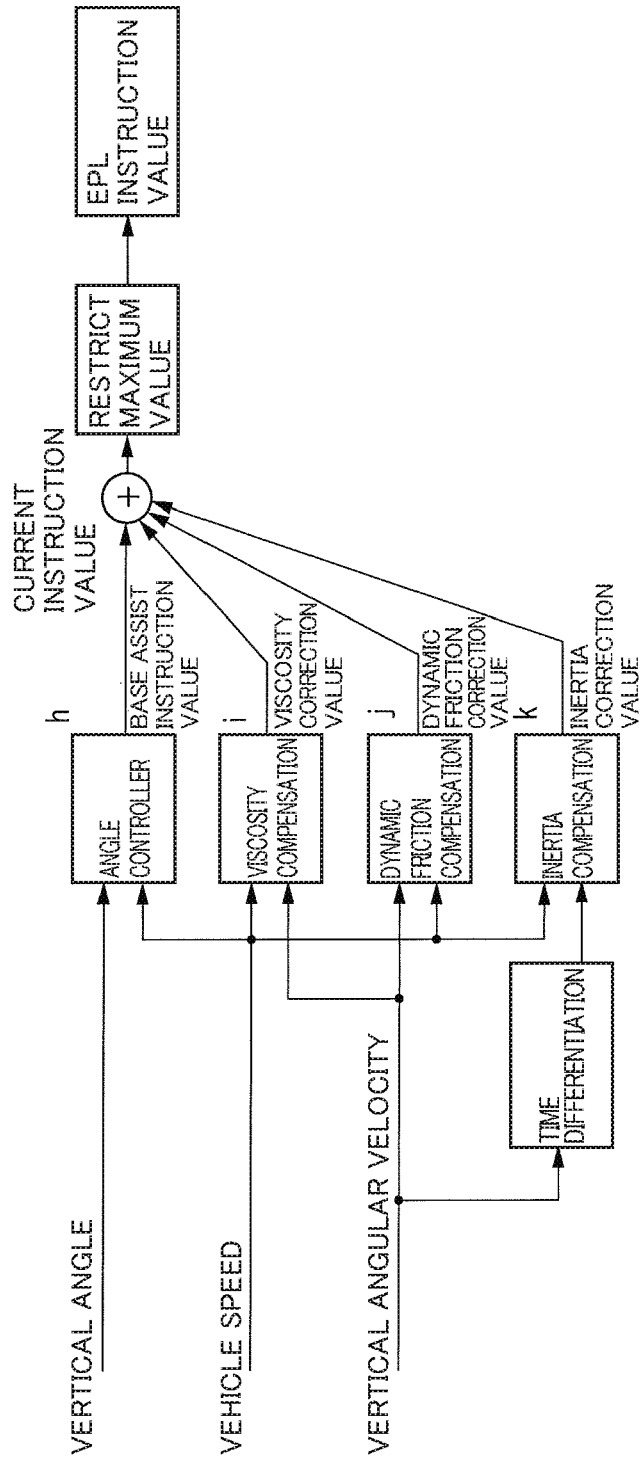
FIG. 10 A schematic view illustrating an example of control of the EPL.

The control section 80 determines an EPL instruction value q in accordance with the vehicle speed, the vertical angle, and the ground angle, for example. FIG. 10 is a schematic view illustrating an example of control showing a method for calculating an EPL instruction value q. As illustrated in FIG. 10, the control section 80 may determine the EPL instruction value q based on (h) through (k) as follows:

(h) The control section 80 determines a base assist instruction value in accordance with the vertical angle and the vehicle speed, for example. As the vertical angle increases, a force input to the upper cross member 51 necessary for reducing the tilt angle of the vehicle 1 increases. As the vehicle speed increases, a force of rotating the handlebar 23 necessary for reducing the tilt angle of the vehicle 1 and/or a force necessary for barycenter movement of the rider increases. In view of this, the base assist instruction value is determined in such a manner that the base assist instruction value increases as the steering torque and the vehicle speed increase.

(i) The control section 80 determines a velocity correction value in accordance with the vehicle speed and the vertical angular velocity, for example. The control section 80 may provide a larger viscosity resistance as the vehicle speed and the vertical angular velocity increase. The viscosity resistance here refers to a resistance spuriously generated by the second actuator 91 in response to an operation by the rider. FIG. 10 shows a configuration in which the viscosity correction value is added to a current instruction value in the same manner as (h) described above and (j) and (k) described below, and the viscosity compensation has a negative coefficient and the viscosity resistance acts as a damping force to the leaning operation.

(j) The control section 80 determines a dynamic friction correction value in accordance with the vehicle speed and the vertical angular velocity, for example. The control section 80 determines a dynamic friction correction value in such a manner that the dynamic friction correction value increases as the vehicle speed and the vertical angular velocity increase, for example. The addition of the dynamic friction correction value may compensate for a dynamic friction force. The dynamic friction force here refers to a dynamic friction force that occurs between mechanical elements on a transfer path of a force from the upper cross member 51 to which an output torque of the second actuator 91 is input to the left front wheel 31 and the right front wheel 32.

(k) The control section 80 determines an inertia correction value in accordance with the vehicle speed and the vertical angular acceleration. The vertical angular acceleration is a value obtained by differentiating an input from the vertical angle sensor with respect to time twice. The control section 80 determines an inertia correction value in such a manner that the inertia correction value increases as the vehicle speed and the vertical angular acceleration increase. The addition of the inertia correction value may compensate for an inertial force of the second actuator 91. The compensation for the inertial force of the second actuator 91 may show a steering feeling similar to a steering feeling in which the second actuator 91 is not mounted on the vehicle 1.

The control section 80 obtains the sum of the values calculated by (h) through (k) to calculate a final EPL instruction value q. At this time, if the upper limit is set for a current value that may be input to the second actuator 91, the control section 80 determines the EPL instruction value q in such a manner that a value smaller than the maximum current value input to the second actuator 91 is output.

With respect to the EPS instruction value p and the EPL instruction value q calculated as described above, the control section 80 finally adjusts the value of the EPS instruction value p and the value of the EPL instruction value q at a specific ratio and then transmits the EPS instruction value p to the first controller 72 of the EPS 70 and transmits the EPL instruction value q to the second controller 92 of the EPL 90.

Specifically, suppose the physical quantities except the vehicle speed are uniform, as the vehicle speed increases, the control section 80 increases a ratio p/q of the EPS instruction value p for determining an output torque of the first actuator 71 with respect to the EPL instruction value q for determining an output torque of the second actuator 91. The control section 80 increases the ratio p/q as the vehicle speed increases while the vehicle speed is in a normal speed range. The normal speed range may be, for example, 0 km/h or more and 200 km/h or less.

In the vehicle 1 according to this embodiment, the use of the EPL 90 enables the vertical angle to change as an operation different from an operation on the handlebar 23 by the rider. Thus, the use of the EPL 90 enables the vertical angle to be operated with a smaller operation on the handlebar 23 than that in a vehicle 1 including no EPL 90.

For example, in a case where the vertical angle increases rightward, the upper cross member 51 rotates counterclockwise relative to the body frame 21 when viewed from the rider. In view of this, in the case where the vertical angle increases rightward, the EPL 90 exerts a rotary force on the upper cross member 51 in such a manner that the upper cross member 51 rotates clockwise when viewed from the rider so as to reduce the vertical angle. On the other hand, in a case where the vertical angle increases leftward, the EPL 90 exerts a rotary force on the upper cross member 51 in such a manner that the upper cross member 51 rotates counterclockwise when viewed from the rider so as to reduce the vertical angle.

As described above, in the case where the vehicle speed is relatively low, if only the EPS 70 is used for suppressing the behavior causing an increase of the vertical angle, an incongruity sense of the rider is likely to occur. In view of this, in this embodiment, the EPL instruction value q is set at a large value in a low-speed range, and is made smaller than a ratio of the output of the EPS with respect to the output of the EPL in a high-speed range so that the behavior causing an increase of the vertical angle may be suppressed. In this manner, an incongruity sense of the rider may be reduced in the low-speed range. In this case, the ratio p/q of the EPS instruction value p with respect to the EPL instruction value q is relatively small. On the other hand, in the case where the vehicle speed is relatively high, the EPS 70 is preferably used for controlling the vertical angle. Thus, in this embodiment, the EPL instruction value q is not set at such a large value in a high-speed range. In this case, the ratio p/q of the EPS instruction value p with respect to the EPL instruction value q is relatively large. Since the control section 80 sets the EPS instruction value p and the EPL instruction value q in the manner described above, the control section 80 performs control of increasing the ratio p/q in accordance with the vehicle speed.

In the vehicle 1 according to this embodiment, the expression "increase the ratio p/q as the vehicle speed increases, suppose physical quantities except the vehicle speed are uniform" refers to that the control section 80 determines the ratio p/q in accordance with at least physical quantities such as the vehicle speed and the vertical angle. The control section 80 may determine the ratio p/q in accordance with physical quantities such as a steering torque, in addition to the vehicle speed and the vertical angle. Although not described in the embodiment above, the EPS instruction value p, the EPL instruction value q, or the ratio p/q of these values may be set in accordance with, for example, an acceleration of the vehicle 1.

The control section 80 increases the ratio p/q as the vehicle speed increases, suppose physical quantities except the vehicle speed are uniform. In a state where the vertical angle is 10 degrees and the vehicle speed is 10 km/h and in a state where the vertical angle is 10 degrees and the vehicle speed is 15 km/h, for example, the control section 80 sets the ratio p/q larger in the latter state. However, physical quantities except the vehicle speed are not uniform in the state where the vertical angle is 10 degrees and the vehicle speed is 10 km/h and in a state where the vertical angle is 15 degrees and the vehicle speed is 15 km/h. Thus, the control section 80 may set the ratio p/q larger in the latter state than in the former state, set the ratio p/q larger in the former state than in the latter state, or set the ratio p/q at the same value in both of the states.

In this embodiment, the control section 80 may control the ratio p/q in such a manner that the ratio p/q gradually changes with a change in the vehicle speed. Since the ratio between the output torque of the first actuator 71 and the output torque of the second actuator 91 in accordance with the vehicle speed gradually changes, an incongruity sense of the rider is less likely to occur. Unlike the above configuration, the ratio p/q may be set to increase stepwise with an increase in the vehicle speed.

In this embodiment, in a case where the vehicle speed is at least in a predetermined range, the control section 80 may determine the EPS instruction value p in such a manner that the output of the first actuator 71 increases with an increase in the vehicle speed.

With the above configuration, the second steering force (assist torque) to the handlebar 23 increases with an increase in the vehicle speed. Since the assist torque to the handlebar 23 acts so as to cancel the Gyroscopic Precession (i.e., a phenomenon in which a force of the front wheels 3 toward retaining their postures occurs) that increases with an increase in the vehicle speed, the rider may operate the handlebar with a light feeling of operation even in a high-speed range. A four-wheel vehicle whose body does not tilt during turning generally includes an EPS 70 in order to improve a stationary steering torque. Thus, in contrast to the control of this embodiment, the assist torque to the handlebar is set to be large in a low-speed range. In a case where an upper limit is set for the output torque of the EPS 70, when the vehicle speed increases to be sufficiently large, the EPS instruction value p may not be set large with an increase in the vehicle speed in some cases. The stationary steering torque refers to a steering torque necessary for changing the steering angle by an operation on the handlebar with the vehicle being stopped.

In this embodiment, during traveling of the vehicle 1, the steering angle of the handlebar 23 changes to increase or decrease when the body frame 21 tilts. In this embodiment, the tilt of the body frame 21 and the steering angle of the handlebar 23 have a relationship in which the tilt of the body frame 21 and the steering angle of the handlebar 23 act on each other. In such a case, in a case where both the EPS 70 and the EPL 90 are mounted on the vehicle 1, one of the EPS 70 or the EPL 90 compensates for the other or both the EPS 70 and the EPL 90 cooperate to enable control of a behavior of the vehicle 1.

As described in (f), the control section 80 may determine the output of the first actuator 71 in accordance with the vertical angle. As described above, as the vertical angle increases, a steering force of the rider necessary for reducing the tilt angle of the vehicle increases. Thus, the EPS instruction value p is determined in such a manner that the EPS instruction value p increases as the vertical angle increases.

As described in (g), the physical quantities include at least one of the vertical angular velocity or the vertical angular acceleration. The control section 80 may determines an output of the first actuator 71 in accordance with at least one of the vertical angular velocity or the vertical angular acceleration. The above configuration may reduce a resistance to a leaning operation of the vehicle 1. That is, an output of the first actuator 71 may be determined so as to avoid an incongruity sense of the rider caused by a behavior of the handlebar due to the output of the first actuator 71 when the rider is leaning the vehicle 1.

As in this embodiment, the vehicle 1 may be configured in such a manner that during traveling, the steering angle of the handlebar 23 changes to increase clockwise when viewed from above when the body frame 21 tilts rightward, whereas the steering angle of the handlebar 23 changes to increase counterclockwise when viewed from above when the body frame 21 tilts leftward.

For example, during traveling, when the body frame 21 tilts rightward, the vehicle 1 is directed to turn rightward. Then, the handlebar 23 also rotates clockwise to further turn the vehicle 1 rightward. This characteristic in which when the vehicle 1 is leaned, the handlebar 23 is further steered to the leaning direction is called a self-steering characteristic. The turning exerts a centrifugal force on the vehicle 1 so that the vertical angle decreases. This embodiment including the function of enabling control of the vertical angle is preferable when being applied to the vehicle 1 having the self-steering characteristic because this characteristic may be either enhanced or reduced depending on situations. In a situation where the output torques of both the first actuator 71 and the second actuator 91 are zero, the rider may operate the vehicle 1 in the same manner as a large number of general vehicles 1 having no actuators.

[Linkage Mechanism]

The embodiment described above is directed to the vehicle 1 including the parallelogram-type linkage mechanism 5, but the present teaching is not limited to this example. The present teaching is also applicable to vehicles including a double wishbone-type linkage mechanism or a leading arm-type linkage mechanism, for example. The linkage mechanism may have a configuration including a shock tower as a cross member that rotates relative to the body frame.

[Acute Angle]

The acute angle in the present teaching and the embodiment described above refers to an angle including 0° and less than 90°. Although the acute angle generally does not include 0°, the acute angle is assumed to include 0° in the present teaching and the embodiment described above. In the embodiment, an imaginary plane orthogonally intersecting with an upper axis and a lower axis of the cross member is a plane extending rearward and upward. However, the present teaching is not limited to this example, and the imaginary plane orthogonally intersecting the upper axis and the lower axis of the cross member may be a plane extending forward and upward.

[Parallel, Extend, Along]

In this specification, the term "parallel" includes two lines that tilt within the range of ±40° and do not intersect with each other as members. In the present teaching, the term "along" used together with, for example, "directions" and "members" includes the case of a tilt within the range of ±40°. In the present teaching, the term "extend" used together with "directions" includes the case of a tilt within the range of ±40°.

[Wheel, Power Unit, Body Cover]

The vehicle 1 according to this embodiment may include a body cover that covers the body frame. The vehicle 1 may not include a body cover that covers the body frame. The power unit includes a power source. The power source is not limited to an engine, and may be an electric motor.

In the embodiment described above, the center of the rear wheel 4 in the left-right direction of the body frame 21 coincides with the center of the distance between the left front wheel 31 and the right front wheel 32 in the left-right direction of the body frame 21. Although such a configuration is preferable, the center of the rear wheels 4 in the left-right direction of the body frame 21 may not coincide with the center of the distance between the left front wheel 31 and the right front wheel 32 in the left-right direction of the body frame 21.

[Positional Relationship Between Head Pipe and Side Member]

In the embodiment described above, the right side member 54, the left side member 53, and the head pipe 211 overlap with each other in a side view of the body frame 21. Alternatively, in the side view of the body frame 21, the head pipe 211 may be at a position different from those of the right side member 54 and the left side member 53 in the front-rear direction. The tilt angles of the right side member 54 and the left side member 53 relative to the top-bottom direction of the body frame 21 may be different from the tilt angle of the head pipe 211.

[Head Pipe]

The head pipe supporting the linkage mechanism may be constituted by a single part or a plurality of parts. In the case where the head pipe is constituted by a plurality of parts, these parts may be joined together by, for example, welding or bonding, or may be joined together with fastening members such as bolts or rivets. In this embodiment, the head pipe 211 is described as a part of the body frame 21 that rotatably supports the steering shaft 60, but the present teaching is not limited to this example. The head pipe may be replaced by a member that supports the steering shaft 60 so that the steering shaft 60 may rotate about the intermediate steering axis Y3. For example, a member including a bearing supporting the steering shaft 60 so that the steering shaft 60 may rotate about the intermediate steering axis Y3 may be employed.

[Configuration of Body Frame: Integrated Part or Different Parts, Configuration of Upper End of Front Edge and Upper and Lower Frame Parts in the Case of Integrated Part]

In this embodiment, the body frame includes a linkage support part for supporting the linkage mechanism, such as the head pipe, a coupling member (upper front-rear frame part), a down frame (top-bottom frame part), and an under frame (lower front-rear frame part), and these members are connected to each other by welding. The body frame according to the present teaching, however, is not limited to the embodiment. The body frame only needs to include the linkage support part, the upper front-rear frame part, the top-bottom frame part, and the lower front-rear frame part. For example, the whole or a part of the body frame may be integrally formed by, for example, casting. The upper front-rear frame part and the top-bottom frame part of the body frame may be constituted by one member or different members.

[Degree of Acute Angle: Steering Shaft and Buffer Device]

In the embodiment described above, each of the left buffer device 33 and the right buffer device 34 includes a pair of telescopic mechanisms. However, in accordance with specifications of the vehicle 1, the number of telescopic mechanisms included in each of the left buffer device 33 and the right buffer device 34 may be one. The embodiment described above is directed to the vehicle 1 including the telescopic-type buffer devices 33 and 34. The present teaching, however, is not limited to this example. The present teaching is also applicable to vehicles including linkage-type buffer devices. In this embodiment, an acute angle formed by the rotation axis of the steering shaft and the top-bottom direction of the body frame coincides with an acute angle formed by the extension/contraction direction of the right buffer device and the left buffer device and the top-bottom direction of the body frame. The present teaching, however, is not limited to the embodiment. For example, an acute angle formed by the intermediate steering axis Y3 of the steering shaft and the top-bottom direction of the body frame may be smaller or larger than an acute angle formed by the extension/contraction direction of the right buffer device and the left buffer device and the top-bottom direction of the body frame.

In this embodiment, the intermediate steering axis Y3 of the steering shaft coincides with the extension/contraction direction of the right buffer device and the left buffer device. The present teaching, however, is not limited to the embodiment. In a side view in a state where the vehicle 1 stands upright, the rotation axis of the steering shaft may be separated from the extension/contraction direction of the right buffer device and the left buffer device in the front-rear direction. Alternatively, the rotation axis and the extension/contraction direction may intersect with each other, for example.

In addition, in this embodiment, the extension/contraction direction of the right buffer device coincides with the right steering axis Y2 of the right buffer device, and the extension/contraction direction of the left buffer device coincides with the left steering axis Y1 of the left buffer device. The present teaching, however, is not limited to the embodiment. The extension/contraction direction of the right buffer device may not coincide with the right steering axis Y2 of the right buffer device, and the extension/contraction direction of the left buffer device may not coincide with the left steering axis Y1 of the left buffer device.

In this embodiment, the right front wheel and the left front wheel are supported in such a manner that the upper ends of the right and left front wheels may move to be above the upper end of the down frame of the body frame in the top-bottom direction of the body frame. The present teaching, however, is not limited to the embodiment. In the present teaching, the upper ends of the right front wheel and the left front wheel may move to be at the same height or below the upper end of the down frame of the body frame in the top-bottom direction of the body frame.

[Cross Member, Side Member]

The upper cross member may include an upper front cross member constituted by a single part, an upper rear cross member constituted by a single part, and a coupling member disposed between these cross members and constituted by a plurality of parts. In the case where the coupling member is constituted by a plurality of parts, these parts may be joined together by, for example, welding or bonding, or may be joined together with fastening members such as bolts or rivets.

The lower cross member may include a lower front cross member constituted by a single part, a lower rear cross member constituted by a single part, and a coupling member disposed between these cross members and constituted by a plurality of parts. In the case where the coupling member is constituted by a plurality of parts, these parts may be joined together by, for example, welding or bonding, or may be joined together with fastening members such as bolts or rivets.

Each of the right side member and the left side member may be constituted by a single part or a plurality of parts. In the case where these side members are constituted by a plurality of parts, these parts may be joined together by, for example, welding or bonding, or may be joined together with fastening members such as bolts or rivets. Each of the right side member and the left side member may include a portion disposed ahead of the upper cross member or the lower cross member in the front-rear direction of the body frame and a portion disposed behind the upper cross member or the lower cross member in the front-rear direction of the body frame. The upper cross member or the lower cross member may be disposed between a portion disposed ahead of the upper cross member and the lower cross member and a portion disposed behind the upper cross member and the lower cross member.

In the present teaching, the linkage mechanism may further include a cross member, in addition to the upper cross member and the lower cross member. The upper cross member and the lower cross member are merely named based on a top-bottom positional relationship. The upper cross member does not represent an uppermost cross member in the linkage mechanism. The upper cross member refers to a cross member located above another cross member located below the upper cross member. The lower cross member does not represent a lowermost cross member in the linkage mechanism. The lower cross member refers to a cross member located below another cross member located above the lower cross member. The cross member may be constituted by two parts of a right cross member and a left cross member. In the manner described above, each of the upper cross member and the lower cross member may be constituted by a plurality of cross members as long as these members have linkage functions. Another cross member may be additionally provided between the upper cross member and the lower cross member. The linkage mechanism only needs to include the upper cross member and the lower cross member.

The configuration of a left-right-tilt-angle-detection-section for detecting a left-right tilt angle is not limited to the configuration including the vertical angle sensor 85 and the ground angle sensor 86 described above. The configuration may include only one of the vertical angle sensor 85 or the ground angle sensor 86. The left-right-tilt-angle-detection-section may be configured to estimate a left-right tilt angle of the body frame 21 by using at least one of a six-axis acceleration or a six-axis speed detected in the vehicle. The left-right-tilt-angle-detection-section may be configured to measure a physical quantity regarding the left-right tilt angle of the body frame. The left-right-tilt-angle-detection-section may include a sensor for detecting relative rotation of the body frame and the linkage mechanism, such as a potentiometer. Alternatively, the left-right-tilt-angle-detection-section may include a proximity sensor (distance sensor). In this case, the proximity sensor may measure a distance between the body frame and the road surface to estimate a left-right tilt angle based on the distance.

The body frame is a member that receives stress on the leaning vehicle during traveling. Examples of the body frame include monocoque (stressed-skin structure), semi-monocoque, and a structure in which a vehicle part also serves as a member that receives stress. For example, a part such as an engine or an air cleaner may be a part of the body frame.

The embodiment described above is based on the following findings of the inventors. First, the inventors conceived that an electric power steering system (EPS) that may assist a steering force is mounted on a vehicle. The inventors also found that the EPS may be used for providing a vertical angle reducing function. The vertical angle reducing function refers to the function of suppressing a behavior causing an increase of the vertical angle by applying a steering force of reducing the vertical angle with the EPS when the vertical angle of the vehicle changes to increase.

Specifically, in suppressing a behavior causing an increase of the vertical angle rightward during traveling, when steering is performed rightward, a force of reducing the vertical angle may be exerted on the vehicle. In the case of suppressing a behavior causing an increase of the vertical angle leftward during traveling, when steering is performed leftward, a force of reducing the vertical angle may be exerted on the vehicle. Here, the expression "steering is performed rightward" refers to turning of the right front wheel and the left front wheel clockwise when viewed from above the vehicle. The expression "steering is performed leftward" refers to turning of the right front wheel and the left front wheel counterclockwise when viewed from above the vehicle.

However, in obtaining the vertical angle reducing function with the EPS, the EPS operates in spite of no steering by the rider, for example, in some cases. In obtaining the vertical angle reducing function with the EPS, the EPS operates the handlebar 23 by a manipulated variable or more in response to steering by the rider in some cases. In obtaining the vertical angle reducing function with the EPS, the EPS does not operate the handlebar 23 in response to steering of the rider in some cases. In these cases, the EPS operation for reducing the vertical angle is exerted in such a manner that the rider feels this EPS operation is a disturbance to the handlebar, and thus, an incongruity sense of the rider might arise.

Based on the foregoing findings, the inventors arrived at the embodiment described above. From these points of view, the embodiment will be described in detail. In the following description, "vertical angle" will be referred to as a "left-right tilt angle of the body frame in the left direction of the leaning vehicle or in the right direction of the leaning vehicle" or simply as a "left-right tilt angle".

As illustrated in (f) in FIG. 9, the control section 80 determines a vertical angle correction value in accordance with the vertical angle, that is, the left-right tilt angle of the body frame. This vertical angle correction value is a value determined in accordance with the left-right tilt angle, and is a value indicating a steering force to be applied to the steered wheel by the actuator. For this reason, the vertical angle correction value will be hereinafter referred to as a tilt angle response instruction value. The following description is directed to details of a determination process of the tilt angle response instruction value.

The control section 80 acquires the tilt angle in the left direction of the body frame or in the right direction of the body frame, that is, the left-right tilt angle, from the vertical angle sensor 85 or the ground angle sensor 86. The value indicating the left-right tilt angle includes, for example, information indicating to which one of the left and right the tilt direction of the body frame is and information indicating the degree of the tilt angle. As an example, in a case where the tilt direction indicated by the acquired left-right tilt angle is left, the control section 80 defines the value indicating a steering force of steering leftward as a tilt angle response instruction value. In this case, in a case where the tilt direction indicated by the acquired left-right tilt angle is right, the control section 80 defines the value indicating a steering force of steering rightward as a tilt angle response instruction value.

In this embodiment, the control section 80 may determine an EPS instruction value by using none of the steering torque and the steering angular velocity. For example, in the example illustrated in FIG. 9, operations (a) through (e) may be omitted. That is, an operation of an instruction value or a correction value based on the steering torque and the steering angular velocity may be omitted. Operation (g) in FIG. 9, that is, an operation of a correction value based on the vertical angular velocity and the vertical angular acceleration may be omitted. In this case, the value calculated by (f) in FIG. 9, that is, the tilt angle response instruction value, is the EPS instruction value.

An operation example of the vehicle 1 in the case where the tilt angle response instruction value is an EPS instruction value will be described. As an example, as described above, the control section 80 may define the value indicating the steering force of steering to the tilt direction of the body frame as the tilt angle response instruction value=the EPS instruction value. In this case, in a state where the body frame 1 tilts leftward, the actuator 71 outputs a force of steering leftward to the left wheel 31 and the right front wheel 32 that are steered wheels. In this case, in a state where the body frame 1 tilts rightward, the actuator 71 outputs a force of steering rightward to the left wheel 31 and the right front wheel 32 that are steered wheels. In this manner, a force of turning the steered wheels to the direction in which the body frame 21 tilts is generated.

While the vehicle 1 is traveling with a tilt, when the steered wheels are turned to the tilt direction, a force of raising the body frame 21 is generated. Thus, by adjusting a steering force by the actuator 71 in accordance with the tilt angle, easiness of the tilt of the body frame 21 by the rider may be adjusted, for example. For example, the body frame 21 may be less likely to tilt when the tilt angle exceeds a predetermined value. In this manner, the lean characteristic of the vehicle 1 may be adjusted by the actuator 71.

In a case where a force of turning to the turning direction is provided to the steered wheels by the actuator 71, the body frame 21 does not easily tilt to the turning direction. Accordingly, the rider may maintain the body frame 21 not to tilt greatly, for example. At this time, the steered wheels may be turned by a force of the actuator 71. This turning reduces the turning radius of the vehicle 1. Some riders may utilize this phenomenon to enabling cornering with reduced turning angles while reducing the tilt of the body frame 21. In this manner, a turning characteristic of the vehicle 1 may be adjusted by the actuator 71.

While the vehicle 1 turns with a tilt, in some cases, a force of turning the steered wheels to the turning direction may be exerted by self-steering. A rider performs an operation of inputting, to the handlebar 23, a force of suppressing turning of the steered wheels by self-steering, that is, retains steering. The retaining of steering is often performed by a manipulation of pushing an inner side in turning of the handlebar 23 (so-called push-steering). When the steered wheels are turned to the tilt direction during traveling of the vehicle 1 with a tilt, a steering force to the turning direction by self-steering increases. Consequently, a force necessary for the rider to retain steering increases. The increase of the steering retaining force may enlarge the range of tilt control by push-steering of the rider. Some riders may enhance flexibility in steering during turning by using the above phenomenon. In this manner, by adjusting the steering force by the actuator 71 in accordance with the tilt angle, a steering retention characteristic may be adjusted.

In the above example, the actuator 71 applies a force of turning the steered wheels to perform steering in the turning direction when the body frame 21 tilts. On the other hand, the actuator 71 may apply a force of turning the steered wheels so as to perform steering in the direction opposite to the turning direction when the body frame 21 tilts. As a specific example of this case, in (f) in FIG. 9, in a case where the direction of a tilt indicated by the acquired left-right tilt angle is left, the control section 80 defines the value indicating a steering force in the direction of steering rightward as a tilt angle response instruction value. In a case where the direction of a tilt indicated by the acquired left-right tilt angle is right, the control section 80 defines the value indicating a steering force of steering leftward as the tilt angle response instruction value. In this case, a force of turning the steered wheels by the actuator 71 may also be adjusted. This adjustment enables adjustment of characteristics and behaviors of the vehicle 1 as described above, for example.

Functions that may be provided by torque adjustment of the steered wheels in accordance with the left-right tilt angle by the actuator 71 are not limited to the examples described above. For example, other various functions concerning left-right tilt of the body frame 21 and steering may be provided.

With (f) in FIG. 9, the control section 80 may change the magnitude of the left-right tilt angle response instruction value in accordance with the acquired left-right tilt angle. In this manner, the magnitude of a force of turning the steered wheels output from the actuator 71 is changed in accordance with the left-right tilt angle. FIGS. 11, 12, 13, and 14 are graphs showing examples in a case where a steering force output from the actuator 71 is changed in accordance with the left-right tilt angle. In FIGS. 11 through 14, the ordinate represents a torque output from the actuator 71, that is, a torque of turning the steered wheels. The ordinate representing a torque is an axis on which a torque of right turning increases as positive values upward and a torque of left steering increases as positive values downward, with respect to zero. The abscissa represents the left-right tilt angle. The abscissa representing the left-right tilt angle is an axis on which a right tilt increases toward the right as positive values and a left tilt increases toward the left as positive values, with respect to zero degrees. In FIGS. 11 through 14, the state of the left-right tilt angle=0 is a case where the top-bottom line of the body frame 21 coincides with the top-bottom line of the vehicle 1.

Figure 11:
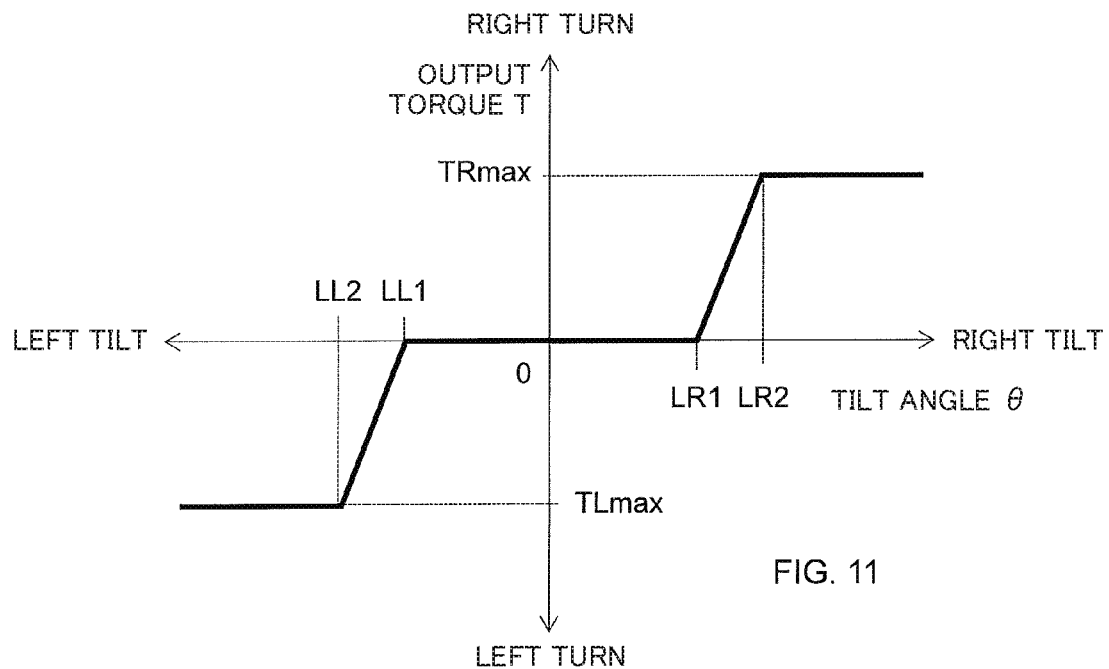
FIG. 11 A graph showing an example of an output steering force of an actuator in accordance with a left-right tilt angle.

In the example illustrated in FIG. 11, when the left-right tilt angle is a first threshold or less, the output torque of the actuator 71 is zero. In a range where the right tilt angle is from a first threshold LR1 to a second threshold LR2 and the left tilt angle is from a first threshold LL1 to a second threshold LL2, the output torque of the actuator 71 increases as the left-right tilt angle increases. In this example, the direction of the torque output from the actuator 71 is the same as the turning direction of turning the vehicle 1 in the direction in which the body frame tilts. A maximum value TRmax of the output torque in a right tilt is equal to a maximum value TLmax of the output torque in a left tilt.

As a variation, a uniform torque may be output when the left-right tilt angle exceeds the first thresholds LR1 and LL1. This is an example of control in which an operation of torque output by the actuator 71 is switched between on and off in accordance with the left-right tilt angle.

In the example illustrated in FIG. 11, a range in which the actuator 71 does not output a torque of steering the steered wheels in accordance with the left-right tilt angle is set from zero to LL1 and from zero to LR1. In this previously set range of the left-right tilt angle, the control section 80 allows the actuator 71 to output a steering torque in accordance with the left-right tilt angle. The thresholds L11 and LR1 of the left-right tilt angle used for determining whether the actuator 71 outputs a torque to the steered wheels or not are in a range where the left-right tilt angle is from zero to a maximum left-right tilt angle. Here, the maximum left-right tilt angle is a maximum value of the left-right tilt angle at which the body frame 21 may tilt. The maximum left-right tilt angle is determined based on physical dimensions of the vehicle 1.

In the example illustrated in FIG. 11, a change in the magnitude, that is, the absolute value, of an output torque of the actuator 71 with respect to the left-right tilt angle when the body frame 21 tilts rightward is the same as a change in the magnitude, that is, the absolute value, of an output torque of the actuator 71 with respect to the left-right tilt angle when the body frame 21 tilts leftward. That is, a change of the magnitude of a steering force output from the actuator 71 to the steered wheels with respect to the left-right tilt angle is the same between the left tilt and the right tilt.

Figure 12:
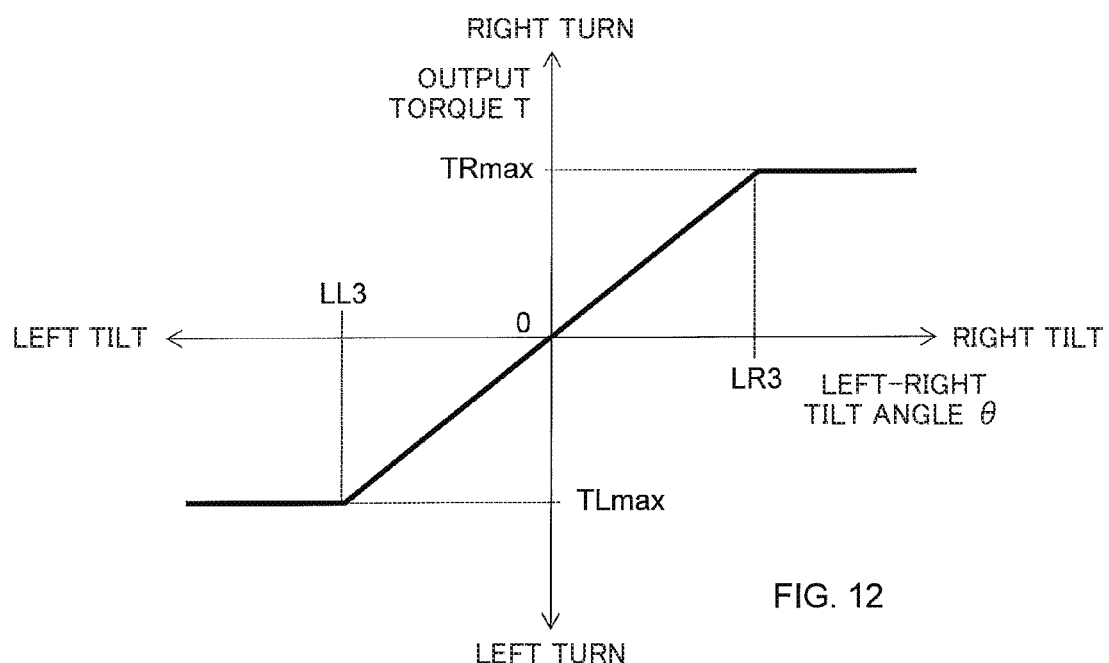
FIG. 12 A graph showing an example of the output steering force of the actuator in accordance with the left-right tilt angle.

In the example illustrated in FIG. 12, in the range where the right tilt angle is from zero to a threshold LR3 and the left tilt angle is from zero to a threshold LL3, the output torque of the actuator 71 increases as the left-right tilt angle increases. In the example illustrated in FIG. 12, a change rate of the output torque of the actuator 71 with respect to the left-right tilt angle is uniform. This change rate may be changed in accordance with the left-right tilt angle. In this example, in the entire range of the left-right tilt angle, the actuator 71 outputs a torque of operating the steered wheels.

Figure 13:
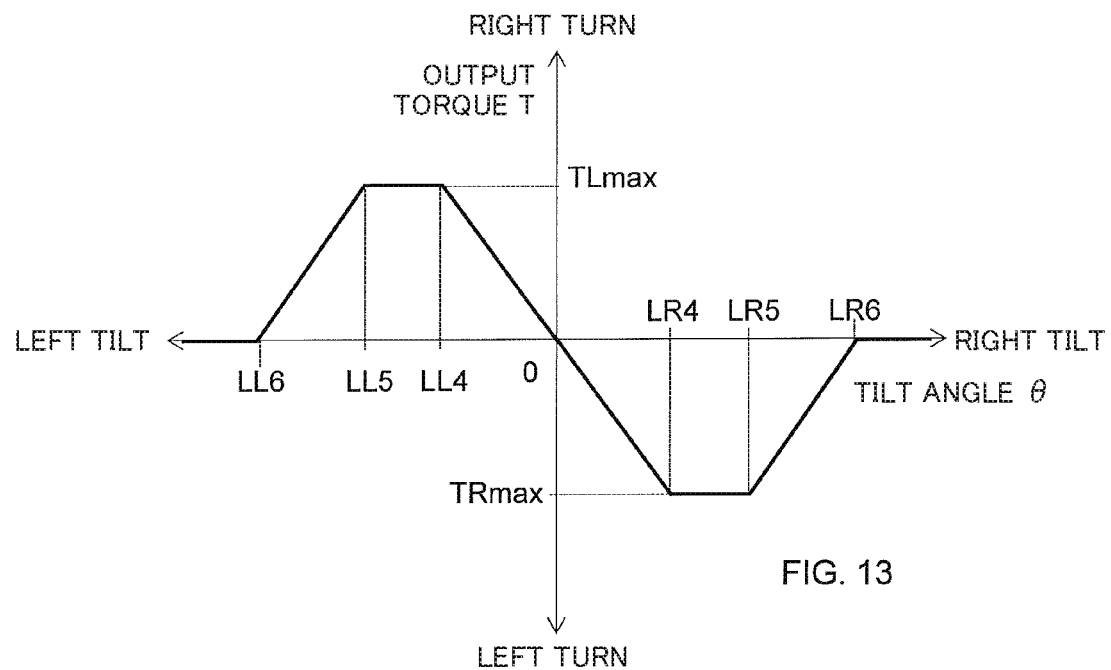
FIG. 13 A graph showing an example of the output steering force of the actuator in accordance with the left-right tilt angle.

In the example illustrated in FIG. 13, the direction of a torque output from the actuator 71 is the turning direction of turning the vehicle 1 in the direction opposite to the direction in which the body frame tilts. In the range where the right tilt angle is from zero to a threshold LR4 and the left tilt angle is from zero to a threshold LL4, the output torque of the actuator 71 increases as the left-right tilt angle increases. In the range where the right tilt angle is from the threshold LR4 to a threshold LR5 and the left tilt angle is from the threshold LL4 to a threshold LL5, the output torque is uniform. In the range where the right tilt angle is from the threshold LR5 to a threshold LR6 and the left tilt angle is from the threshold LL5 to a threshold LL6, the output torque of the actuator 71 decreases as the left-right tilt angle increases. The range in which the actuator 71 outputs a torque of steering the steered wheels in accordance with the left-right tilt angle is set in a range where the right tilt angle is the threshold LR6 or less and the left tilt angle is LL6 or less.

Figure 14:
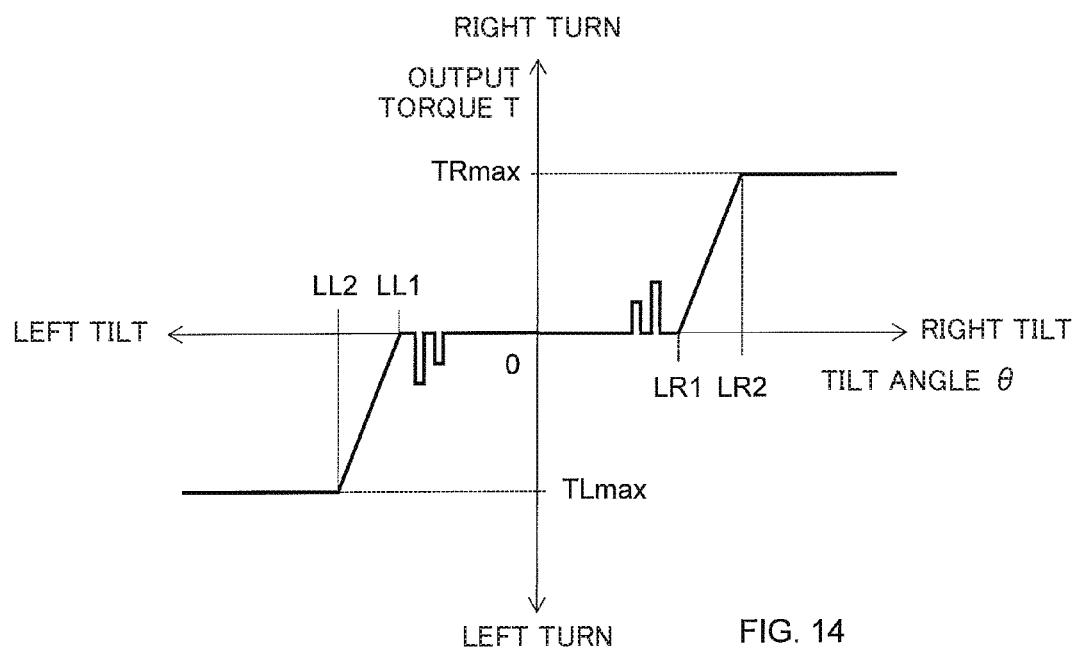
FIG. 14 A graph showing an example of the output steering force of the actuator in accordance with the left-right tilt angle.

In the example illustrated in FIG. 14, in the range where the right tilt angle is from zero to the threshold LR1 and the range where the left tilt angle is from zero to the threshold LL1, the actuator 71 outputs a plurality of pulses of output torques. The plurality of pulses have different intensities. In this example, the pulse intensity increases as the left-right tilt angle increases. In this manner, when the right tilt angle approaches the threshold LR1 or when the left tilt angle approaches the threshold LL1, the actuator 71 intermittently turns the steered wheels. The rider may feel this turning of the steered wheels by the actuator 71 based on, for example, a change in rotation of the handlebar 23 or a change in a tilt of the body frame 21. Accordingly, for example, the rider may be notified of the approach of the right tilt angle to the threshold LR1 or the approach of the left tilt angle to the threshold LL1. This control of the torque of turning the steered wheels by the actuator 71 enables the rider to be notified of a vehicle state. In the example illustrated in FIG. 14, when the right tilt angle exceeds the threshold LR1 or the left tilt angle exceeds the threshold LL1, the actuator 71 applies, to the steered wheels, a turning torque of turning the vehicle 1 to the tilt direction. Thus, when the right tilt angle exceeds the threshold LR1 or the left tilt angle exceeds the threshold LL1, it is more difficult for the rider to tilt the body frame 21.

As described above, control of changing a torque output by the actuator 71 in accordance with the left-right tilt angle may be achieved by, for example, (f) in FIG. 9 in which the control section 80 outputs a value in accordance with the acquired left-right tilt angle as a tilt angle response value. The control section 80 may determine, by an operation or by using corresponding data, a tilt angle response instruction value corresponding to the acquired left-right tilt angle. As the corresponding data, map data in which tilt angle response instruction values corresponding to various left-right tilt angles are recorded may be used, for example. As an example of the operation, the control section 80 may calculate a tilt angle response instruction value corresponding to the acquired left-right tilt angle by using a previously recorded parameter. The parameter may include, for example, thresholds of the left-right tilt angle such as the thresholds LR1 through LR6 and the thresholds LL1 through LL6, change rates of the tilt angle response instruction value with respect to the left-right tilt angle, or maximum values of the tilt angle response instruction values.

The control section 80 may further use the vehicle speed in addition to the left-right tilt angle to control an output torque of the actuator 71. For example, at least one of the maximum value of the output torque of the actuator 71, the change rate of the output torque with respect to the left-right tilt angle, or the range of the left-right tilt angle in which the actuator 71 outputs a torque may be changed in accordance with the vehicle speed. Accordingly, a torque output by the vehicle speed in accordance with the left-right tilt angle may be adjusted in accordance with the vehicle speed.

In (f) in FIG. 9 the control section 80 may acquire the vehicle speed in addition to the left-right tilt angle. The control section 80 calculates a tilt angle response instruction value corresponding to the acquired vehicle speed and the left-right tilt angle by an operation or by using corresponding data. As the corresponding data, a map data in which tilt angle response instruction values corresponding to a plurality of combinations of vehicle speeds and the left-right tilt angles are recorded may be used.

The control section 80 may restrict a time change rate of a torque output by the actuator 71. For example, in (f) in FIG. 9, in calculating a tilt angle response instruction value, a time change of the tilt angle response instruction value may be controlled not to exceed a predetermined value. The control section 80 calculates a tilt angle response instruction value corresponding to the acquired left-right tilt angle by an operation or by using corresponding data. The control section 80 compares the calculated tilt angle response instruction value with a tilt angle response instruction value calculated in the past to thereby determine a change in the tilt angle response instruction value with time. In a case where this time change exceeds a predetermined value, the calculated tilt angle response instruction value may be reduced. In this manner, the time change rate of a torque output from the actuator 71 may be limited.

The control section 80 may also use the time change rate of the left-right tilt angle in addition to the left-right tilt angle to control an output torque of the actuator 71. The time change rate of the left-right tilt angle is an angular velocity of the left-right tilt angle. The vertical angular velocity is an example of a time change rate of the left-right tilt angle. In (g) in FIG. 9, the control section 80 acquires a vertical angular velocity and a vertical angular acceleration. That is, the control section 80 acquires an angular velocity and an angular acceleration of the left-right tilt angle. The control section 80 calculates a leaning operation correction value based on the acquired angular velocity of the left-right tilt angle. The control section 80 may omit acquisition of the vertical angular acceleration.

Based on the acquired angular velocity of the left-right tilt angle, the control section 80 may determine which one of the left and right the body frame 21 is to tilt. The control section 80 may determine a leaning operation correction value in accordance with the direction in which the body frame 21 is to tilt.

For example, in a case where the acquired angular velocity of the left-right tilt angle indicates that the body frame 21 is to tilt leftward, the control section 80 may calculate a leaning operation correction value indicating an increase in a torque of steering leftward and output from the actuator 71. In addition, in a case where the acquired angular velocity of the left-right tilt angle indicates that the body frame 21 is to tilt rightward, the control section 80 may calculate a leaning operation correction value indicating an increase in a torque of steering rightward and output from the actuator 71. Accordingly, the control section 80 may control the actuator 71 so as to increase a steering torque of steering to the direction in which the body frame 21 is to tilt. In this case, in a torque output from the actuator 71, a component of a force in the direction opposite to the direction in which the body frame 21 is to tilt increases. In this case, motion in which the body frame 21 is to tilt may be reduced.

Alternatively, in a case where the acquired angular velocity of the left-right tilt angle indicates that the body frame 21 is to tilt leftward, the control section 80 may calculate a leaning operation correction value indicating an increase in a torque of steering rightward and output from the actuator 71. Furthermore, in a case where the acquired angular velocity of the left-right tilt angle indicates that the body frame 21 is to tilt rightward, the control section 80 may calculate a leaning operation correction value indicating an increase in a torque of steering leftward and output from the actuator 71. Accordingly, the control section 80 may control the actuator 71 so as to increase a steering torque of steering in the direction opposite to the direction in which the body frame 21 is to tilt. In this case, in a torque output from the actuator 71, a component of a force in the direction in which the body frame 21 is to tilt increases. In this case, motion in which the body frame 21 is to tilt may be promoted.

Alternatively, the control section 80 may estimate a future left-right tilt angle by using an angular velocity of the left-right tilt angle. In this case, the control section 80 may control an output of the actuator 71 by using the estimated value of the left-right tilt angle. As an example, a left-right tilt angle θf after Δt seconds may be calculated by the following equation:

$$\theta f = \theta + \Delta t \times \omega$$

where θ is a current left-right tilt angle (deg), Δt is an anticipated time (t), and ω is an angular velocity (roll rate) (deg/s) of the left-right tilt angle.

In FIG. 9, the control section 80 calculates a tilt angle response instruction value determined in accordance with the left-right tilt angle and a leaning operation correction value determined in accordance with the angular velocity of the left-right tilt angle. Alternatively, one value determined in accordance with the left-right tilt angle and the angular velocity of the left-right tilt angle may be calculated as, for example, a tilt angle response instruction value.

In the embodiment described above, the EPS is configured to assist an operation of the rider. On the other hand, the control section 80 controls an output of the actuator 71 in accordance with the left-right tilt angle to thereby autonomously control a tilt of the body frame 15 in the left direction or in the right direction. For example, in a state where steering is not input by the rider, posture control of the vehicle 1 may be automatically performed.

In sum of the above embodiment, the leaning vehicle may have the following configuration. The leaning vehicle includes: a body frame that tilts leftward when turning leftward in a left-right direction of the leaning vehicle, and tilts rightward when turning rightward in the left-right direction of the leaning vehicle; a steered wheel and a non-steered wheel, the steered wheel and the non-steered wheel being arranged in a front-rear direction of the body frame, the steered wheel being capable of being steered, the non-steered wheel being incapable of being steered; a motor that applies a force of steering the steered wheel; a left-right-tilt-angle-detection-section that detects a left-right tilt angle of the body frame in the left direction of the leaning vehicle or in the right direction of the leaning vehicle; and a control device that controls the motor. The control device causes the motor to output a force of steering the steered wheel in a direction that causes the leaning vehicle to turn rightward in a case where the body frame tilts rightward in accordance with a left-right tilt angle detected by the left-right-tilt-angle-detection-section, and causes the motor to output a force of steering the steered wheel in a direction that causes the leaning vehicle to turn leftward in a case where the body frame tilts leftward in accordance with the left-right tilt angle detected by the left-right-tilt-angle-detection-section, or the control device causes the motor to output a force of steering the steered wheel in the direction that causes the leaning vehicle to turn leftward in the case where the body frame tilts rightward in accordance with the left-right tilt angle detected by the left-right-tilt-angle-detection-section, and causes the motor to output a force of steering the steered wheel in the direction that causes the leaning vehicle to turn rightward in the case where the body frame tilts leftward in accordance with the left-right tilt angle detected by the left-right-tilt-angle-detection-section.

The control device controls the motor in such a manner that a direction of a steering force applied by the motor to the steered wheel in a case where the body frame tilts rightward and a direction of a steering force applied by the motor to the steered wheel in a case where the body frame tilts leftward are different from each other, that is, opposite to each other. Here, the direction of the steering force applied to the steered wheel is either a direction of turning the leaning vehicle leftward or a direction of turning the leaning vehicle rightward.

The control device may be configured in such a manner that the motor applies a force of steering the steered wheel in at least a part of a period in which the body frame tilts in the left direction or in the right direction. In a part of the period in which the body frame tilts in the left direction or in the right direction, the motor may be in a state of applying no torque to the steered wheel. The control device may cause the motor to output a force of steering the steered wheel in accordance with the left-right tilt angle in a period in which the body frame does not tilt in the left direction or in the right direction.

In the embodiment, the control section 80 is an example of the control device. The vertical angle sensor 85 is an example of the left-right-tilt-angle-detection-section. Each of the left front wheel 31 and the right front wheel 32 is an example of the steered wheel. The rear wheel 4 is an example of a non-steered wheel. The actuator 71 may be a motor.

As described above, the present teaching is obtained by finding that a vertical angle reducing function may be obtained by using an EPS. Thus, in the vehicle 1 according to the embodiment, the EPL may be omitted. That is, the present teaching is also applicable to a leaning vehicle not including a pivot force application device that applies, to a cross member of a linkage mechanism, a pivot force to a body frame by an actuator. Although the ratio between the EPS instruction value and the EPL instruction value is controlled in the embodiment, the control of the ratio may be omitted. The control section may supply the EPS instruction value to the EPS irrespective of the EPL instruction value.

Leaning vehicles to which the present teaching is applicable are not limited to a vehicle including a pair of left and right front wheels as steered wheels and one rear wheel as a non-steered wheel. For example, the present teaching is also applicable to a motorcycle including one front wheel and one rear wheel, for example. In this case, the front wheel may be used as a steered wheel, and the rear wheel may be used as a non-steered wheel. Alternatively, the present teaching may be applied to a leaning vehicle including one front wheel and two rear wheels or a leaning vehicle including two or more front wheels and two or more rear wheels. The present teaching is also applicable to a leaning vehicle including one or more front wheels as non-steered wheels and one or more rear wheels as steered wheels. In the case where one or more rear wheels are provided as steered wheels, when the rear wheels as the steered wheels are turned rightward when viewed from above the vehicle, the vehicle turns leftward. When the rear wheels as the steered wheels are turned leftward when viewed from above the vehicle, the vehicle turns rightward.

A state where the body frame tilts leftward may be a state in which the top-bottom line of the body frame tilts leftward in the left-right direction of the leaning vehicle relative to the vertical line. Alternatively, a state where the top-bottom line of the body frame tilts leftward in the left-right direction of the leaning vehicle relative to a line perpendicular to the road surface may be the state where the body frame tilts leftward. A state where the body frame tilts rightward may be a state where the top-bottom line of the body frame tilts rightward in the left-right direction of the leaning vehicle relative to the vertical line. Alternatively, the state where the top-bottom line of the body frame tilts rightward in the left-right direction of the leaning vehicle relative to the line perpendicular to the road surface may be the state where the body frame tilts rightward. Which one of the vertical line or the line perpendicular to the road surface a reference for the direction of a tilt of the body frame in the left direction or in the right direction is may be determined as appropriate depending on equipment, application, and characteristics of the leaning vehicle, for example.

The present teaching may be embodied in a large number of different modes. This disclosure should be considered as providing embodiments of principles of the present teaching. A large number of illustrated embodiments are described here based on the understanding that the present teaching is not limited to preferred embodiments described here and/or illustrated in the drawings.

Some illustrated embodiments of the present teaching have been described here. The present teaching should not be limited to these types of preferred embodiments. The present teaching encompasses every embodiment including equivalent elements, modifications, deletions, combinations (e.g., combinations of features across the embodiments), improvements, and/or changes, conceivable by those skilled in the art based on this disclosure. Limitations of claims should be broadly interpreted based on terms used in the claims, and should not be limited to embodiments in this specification and added in the prosecution of this application. Such embodiments should be regarded as nonexclusive.

For example, in this disclosure, terms such as "preferably" and "preferable" are nonexclusive, and means that "preferably but not restrictive" and "preferable but not restrictive".

1 vehicle
2 vehicle body
3 front wheel
4 rear wheel
5 linkage mechanism
6 steering force transfer mechanism
21 body frame
22 body cover
23 handlebar
31 left front wheel
32 right front wheel
33 left buffer device
34 right buffer device
51 upper cross member
52 lower cross member
53 left side member
54 right side member
60 steering shaft
61 first transfer plate
62 second transfer plate
63 third transfer plate
64 first joint
65 second joint
66 third joint
67 tie rod
70 EPS
80 control section
81 steering angle sensor
82 steering torque sensor
83 left wheel speed sensor
84 right wheel speed sensor
85 vertical angle sensor
86 ground angle sensor
90 EPL
91 second actuator
92 second controller
211 head pipe
212 down frame
213 rear frame
214 under frame
221 front cover
223 front fender
224 rear fender
225 leg shield
226 center cover
227 first front fender
228 second front fender
314 left axle member
317 first bracket
324 right axle member
327 second bracket
331 left rear telescopic element
332 left front telescopic element
341 right rear telescopic element
342 right front telescopic element
711 left brake disc
721 right brake disc
C upper intermediate axis
E upper right axis
J upper left axis
K lower intermediate axis
G lower left axis
H lower right axis
Y1 left steering axis
Y2 right steering axis
Y3 intermediate steering axis

The invention claimed is:

1. A leaning vehicle comprising:
   a body frame;
   a steering shaft connected to the body frame rotatably about an intermediate steering axis extending in a top-bottom direction;
   a first wheel connected to the steering shaft such that the first wheel orbits the intermediate steering axis as the steering shaft rotates about the intermediate steering axis relative to the body frame;
   a second wheel located in a front-rear direction of the body frame relative to the first wheel, the second wheel configured to be incapable of being rotated about the intermediate steering axis together with the steering shaft;
   a linkage mechanism that tilts the body frame leftward based on a first rotation of the steering shaft turning the leaning vehicle leftward in a left-right direction of the leaning vehicle, and that tilts the body frame rightward based on a second rotation of the steering shaft turning the leaning vehicle rightward in the left-right direction of the leaning vehicle;
   a motor that applies a steering force to steer the first wheel based on a rotation of the steering shaft; a left-right-tilt-angle-detection-system that respectively detects a left-right tilt angle of the body frame in the left direction of the leaning vehicle and in the right direction of the leaning vehicle; and
   a control circuit that
   causes the motor to output the steering force to steer the first wheel in a direction that causes the leaning vehicle to turn rightward in a case where the body frame tilts rightward in accordance with the left-right tilt angle detected by the left-right-tilt-angle-detection-section, and causes the motor to output the steering force to steer the first wheel in a direction that causes the leaning vehicle to turn leftward in a case where the body frame tilts leftward in accordance with the left-right tilt angle detected by the left-right-tilt-angle-detection-section, or
   causes the motor to output the steering force to steer the first wheel in the direction that causes the leaning vehicle to turn leftward in the case where the body frame tilts rightward in accordance with the left-right tilt angle detected by the left-right-tilt-angle-detection-section, and causes the motor to output the steering force to steer the first wheel in the direction that causes the leaning vehicle to turn rightward in the case where the body frame tilts leftward in accordance with the left-right tilt angle detected by the left-right-tilt-angle-detection-section, wherein
   the control circuit
   changes a magnitude of the steering force to steer the first wheel in the direction that causes the leaning vehicle to turn rightward output from the motor in the case where the body frame tilts rightward in accordance with the left-right tilt angle detected by the left-right-tilt-angle-detection-section, and changes a magnitude of the steering force to steer the first wheel in the direction that causes the leaning vehicle to turn leftward output from the motor in the case where the body frame tilts leftward in accordance with the left-right tilt angle detected by the left-right-tilt-angle-detection-section, or
   changes the magnitude of the steering force to steer the first wheel in the direction that causes the leaning vehicle to turn leftward output from the motor in the case where the body frame tilts rightward in accordance with the left-right tilt angle detected by the left-right-tilt-angle-detection-section, and changes the magnitude of the steering force to steer the first wheel in the direction that causes the leaning vehicle to turn rightward output from the motor in the case where the body frame tilts leftward in accordance with the left-right tilt angle detected by the left-right-tilt-angle-detection-section, and
   the control circuit
   limits a change rate of the magnitude of the steering force to steer the first wheel in the direction that causes the leaning vehicle to turn rightward output from the motor in the case where the body frame tilts rightward, and limits the change rate of the magnitude of the steering force to steer the first wheel in the direction that causes the leaning vehicle to turn leftward output from the motor in the case where the body frame tilts leftward, or
   limits the change rate of the magnitude of the steering force to steer the first wheel in the direction that causes the leaning vehicle to turn leftward output from the motor in the case where the body frame tilts rightward, and limits the change rate of the magnitude of the steering force to steer the first wheel in the direction that causes the leaning vehicle to turn rightward output from the motor in the case where the body frame tilts leftward.

2. The leaning vehicle according to claim 1, wherein the control circuit
   changes, in accordance with a vehicle speed, the change rate of the magnitude of the steering force to steer the first wheel in the direction that causes the leaning vehicle to turn rightward output from the motor in the case where the body frame tilts rightward with respect to the tilt angle, and changes, in accordance with the vehicle speed, the change rate of the magnitude of the steering force to steer the first wheel in the direction that causes the leaning vehicle to turn leftward output from the motor in the case where the body frame tilts leftward with respect to the tilt angle or
   changes, in accordance with the vehicle speed, the change rate of the magnitude of the steering force to steer the first wheel in the direction that causes the leaning vehicle to turn leftward output from the motor in the case where the body frame tilts rightward with respect to the tilt angle, and changes, in accordance with the vehicle speed, the change rate of the magnitude of the steering force to steer the first wheel in the direction that causes the leaning vehicle to turn rightward output from the motor in the case where the body frame tilts leftward with respect to the tilt angle.

3. The leaning vehicle of claim 1, wherein the control circuit
   sets a range of the left-right tilt angle in outputting the steering force to steer the first wheel in the direction that causes the leaning vehicle to turn rightward output from the motor in the case where the body frame tilts rightward, and sets the range of the left-right tilt angle in outputting the steering force to steer the first wheel in the direction that causes the leaning vehicle to turn leftward output from the motor in the case where the body frame tilts leftward,
   or sets the range of the left-right tilt angle in outputting the steering force to steer the first wheel in the direction that causes the leaning vehicle to turn leftward output from the motor in the case where the body frame tilts rightward, and sets the range of the left-right tilt angle in outputting the steering force to steer the first wheel in the direction that causes the leaning vehicle to turn rightward output from the motor in the case where the body frame tilts leftward.

4. The leaning vehicle of claim 1, wherein the control circuit changes, in accordance with a vehicle speed, a range of the left-right tilt angle in outputting the steering force to steer the first wheel in the direction that causes the leaning vehicle to turn rightward output from the motor in the case where the body frame tilts rightward, and changes, in accordance with the vehicle speed, the range of the left-right tilt angle in outputting the steering force to steer the first wheel in the direction that causes the leaning vehicle to turn leftward output from the motor in the case where the body frame tilts leftward, or changes, in accordance with the vehicle speed, the range of the left-right tilt angle in outputting the steering force to steer the first wheel in the direction that causes the leaning vehicle to turn leftward output from the motor in the case where the body frame tilts rightward, and changes, in accordance with the vehicle speed, the range of the left-right tilt angle in outputting the steering force to steer the first wheel in the direction that causes the leaning vehicle to turn rightward output from the motor in the case where the body frame tilts leftward.

5. The leaning vehicle of claim 1, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the vehicle speed, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the vehicle speed.

6. The leaning vehicle according to claim 5, wherein the control circuit changes, in accordance with the vehicle speed, a maximum value of the magnitude of the steering force to steer the first wheel in the direction that causes the leaning vehicle to turn rightward output from the motor in the case where the body frame tilts rightward, and changes, in accordance with the vehicle speed, the maximum value of the magnitude of the steering force to steer the first wheel in the direction that causes the leaning vehicle to turn leftward output from the motor in the case where the body frame tilts leftward, or changes, in accordance with the vehicle speed, the maximum value of the magnitude of the steering force to steer the first wheel in the direction that causes the leaning vehicle to turn leftward output from the motor in the case where the body frame tilts rightward, and changes, in accordance with the vehicle speed, the maximum value of the magnitude of the steering force to steer the first wheel in the direction that causes the leaning vehicle to turn rightward output from the motor in the case where the body frame tilts leftward.

7. The leaning vehicle of claim 1, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and a change rate of the left-right tilt angle, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the change rate of the left-right tilt angle, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the change rate of the left-right tilt angle, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the change rate of the left-right tilt angle.

8. The leaning vehicle of claim 1, wherein the motor includes:

an electric power steering system including a first actuator that applies a steering force to the steering shaft; and a rotary force application device including a second actuator that applies a rotating force to the linkage mechanism.

9. The leaning vehicle of claim 1, further comprising a third wheel located in the left/right direction of the leaning vehicle with respect to the first wheel, wherein the linkage mechanism comprises:
a left side member connected to the first wheel;
a right side member connected to the third wheel; and
a plate-shaped member connected to the left side member and the right side member and to the steering shaft, wherein the plate-shaped member is rotatably connected to the body frame such that rotation of the plate-shaped member relative to the body frame causes the body frame to tilt.

10. The leaning vehicle of claim 2, wherein the control circuit sets a range of the left-right tilt angle in outputting the steering force to steer the first wheel in the direction that causes the leaning vehicle to turn rightward output from the motor in the case where the body frame tilts rightward, and sets the range of the left-right tilt angle in outputting the steering force to steer the first wheel in the direction that causes the leaning vehicle to turn leftward output from the motor in the case where the body frame tilts leftward, or sets the range of the left-right tilt angle in outputting the steering force to steer the first wheel in the direction that causes the leaning vehicle to turn leftward output from the motor in the case where the body frame tilts rightward, and sets the range of the left-right tilt angle in outputting the steering force to steer the first wheel in the direction that causes the leaning vehicle to turn rightward output from the motor in the case where the body frame tilts leftward.

11. The leaning vehicle of claim 2, wherein the control circuit changes, in accordance with a vehicle speed, a range of the left-right tilt angle in outputting the steering force to steer the first wheel in the direction that causes the leaning vehicle to turn rightward output from the motor in the case where the body frame tilts rightward, and changes, in accordance with the vehicle speed, the range of the left-right tilt angle in outputting the steering force to steer the first wheel in the direction that causes the leaning vehicle to turn leftward output from the motor in the case where the body frame tilts leftward, or changes, in accordance with the vehicle speed, the range of the left-right tilt angle in outputting the steering force to steer the first wheel in the direction that causes the leaning vehicle to turn leftward output from the motor in the case where the body frame tilts rightward, and changes, in accordance with the vehicle speed, the range of the left-right tilt angle in outputting the steering force to steer the first wheel in the direction that causes the leaning vehicle to turn rightward output from the motor in the case where the body frame tilts leftward.

12. The leaning vehicle of claim 3, wherein the control circuit changes, in accordance with a vehicle speed, a range of the left-right tilt angle in outputting the steering force to steer the first wheel in the direction that causes the leaning vehicle to turn rightward output from the motor in the case where the body frame tilts rightward, and changes, in accordance with the vehicle speed, the range of the left-right tilt angle in outputting the steering force to steer the first wheel in the direction that causes the leaning vehicle to turn leftward output from the motor in the case where the body frame tilts leftward, or changes, in accordance with the vehicle speed, the range of the left-right tilt angle in outputting the steering force to steer the first wheel in the direction that causes the leaning vehicle to turn leftward output from the motor in the case where the body frame tilts rightward, and changes, in accordance with the vehicle speed, the range of the left-right tilt angle in outputting the steering force to steer the first wheel in the direction that causes the leaning vehicle to turn rightward output from the motor in the case where the body frame tilts leftward.

13. The leaning vehicle of claim 2, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the vehicle speed, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the vehicle speed.

14. The leaning vehicle of claim 3, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the vehicle speed, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the vehicle speed.

15. The leaning vehicle of claim 4, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the vehicle speed, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the vehicle speed, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the vehicle speed.

16. The leaning vehicle of claim 2, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and a change rate of the left-right tilt angle, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the change rate of the left-right tilt angle, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the change rate of the left-right tilt angle, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the change rate of the left-right tilt angle.

17. The leaning vehicle of claim 3, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and a change rate of the left-right tilt angle, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the change rate of the left-right tilt angle, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the change rate of the left-right tilt angle, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the change rate of the left-right tilt angle.

18. The leaning vehicle of claim 4, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and a change rate of the left-right tilt angle, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the change rate of the left-right tilt angle, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the change rate of the left-right tilt angle, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the change rate of the left-right tilt angle.

19. The leaning vehicle of claim 5, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and a change rate of the left-right tilt angle, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the change rate of the left-right tilt angle, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the change rate of the left-right tilt angle, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the change rate of the left-right tilt angle.

20. The leaning vehicle of claim 6, wherein the control circuit causes the motor to output the steering force to steer the first wheel in the direction that causes the leaning vehicle to turn rightward in the case where the body frame tilts rightward in accordance with the left-right tilt angle detected by the left-right-tilt-angle-detection-section and a change rate of the left-right tilt angle, and causes the motor to output the steering force to steer the first wheel in the direction that causes the leaning vehicle to turn leftward in the case where the body frame tilts leftward in accordance with the left-right tilt angle detected by the left-right-tilt-angle-detection-section and the change rate of the left-right tilt angle, or causes the motor to output the steering force to steer the first wheel in the direction that causes the leaning vehicle to turn leftward in the case where the body frame tilts rightward in accordance with the left-right tilt angle detected by the left-right-tilt-angle-detection-section and the change rate of the left-right tilt angle, and causes the motor to output the steering force to steer the first wheel in the direction that causes the leaning vehicle to turn rightward in the case where the body frame tilts leftward in accordance with the left-right tilt angle detected by the left-right-tilt-angle-detection-section and the change rate of the left-right tilt angle.

* * * * *